United States Patent
Corley

(10) Patent No.: US 11,077,928 B2
(45) Date of Patent: *Aug. 3, 2021

(54) ANCHOR AND MOTOR CAP WITH LIGHT AND CAMERA MOUNT

(71) Applicant: Christian L. Corley, Bottineau, ND (US)

(72) Inventor: Christian L. Corley, Bottineau, ND (US)

(*) Notice: Subject to any disclaimer, the term of this patent is extended or adjusted under 35 U.S.C. 154(b) by 0 days.

This patent is subject to a terminal disclaimer.

(21) Appl. No.: 16/751,837

(22) Filed: Jan. 24, 2020

(65) Prior Publication Data

US 2020/0156754 A1    May 21, 2020

Related U.S. Application Data

(60) Division of application No. 16/410,068, filed on May 13, 2019, now Pat. No. 10,787,239, which is a
(Continued)

(51) Int. Cl.
*B63J 3/00* (2006.01)
*H02B 1/20* (2006.01)
(Continued)

(52) U.S. Cl.
CPC ............... *B63J 3/00* (2013.01); *B63B 17/00* (2013.01); *B63B 34/20* (2020.02); *B63B 45/04* (2013.01);
(Continued)

(58) Field of Classification Search
CPC ...... H01R 31/065; H01R 31/06; H01R 33/94; H01R 2201/26; H01R 13/73;
(Continued)

(56) References Cited

U.S. PATENT DOCUMENTS

| | | |
|---|---|---|
| 1,351,817 A | 9/1920 | Walters |
| 4,625,742 A | 12/1986 | Phillips |
| (Continued) | | |

FOREIGN PATENT DOCUMENTS

DE     202005009976     9/2005

OTHER PUBLICATIONS

Bits and Pieces, "Hi-Tech LED Walking and Hiking Staff", http://www.bitsandpieces.com/product/hitech_led_walking_and_hiking_staff/multi_function_gadgets?p=0939377&utm_medium=shopping_engine&CAWELAID=120020260000000612&CAGPSPN=pla&gclid=Cj0KEQjwrPqnBRD56dGe1o_WIZsBEiQAb5ugt2el7XodvDsL5vXs0gubTxfJKo-OLP1nYpD4nbK08, 2014.
(Continued)

*Primary Examiner* — Gary F Paumen
(74) *Attorney, Agent, or Firm* — Law Office of Mark Brown, LLC; Christopher M. DeBacker

(57) ABSTRACT

The present invention generally provides an anchor cap or a motor cap for mounting a monopod. The cap includes a navigation light power port typical of a marine vessel, such as a bass boat or speed boat. The cap would connect to the top of an anchor affixed to the marine vessel. The monopod can then provide power for mobile accessories, such as cameras and smart phones. The monopod may be fitted with extendable, bendable arms for mounting additional cameras or other electronic devices or for providing additional accessories. The box could also include other power outlets, including universal serial bus (USB) or standard power outlet ports.

19 Claims, 43 Drawing Sheets

Related U.S. Application Data continuation-in-part of application No. 15/812,882, filed on Nov. 14, 2017, now Pat. No. 10,312,706, which is a continuation-in-part of application No. 15/184,721, filed on Jun. 16, 2016, now Pat. No. 9,981,723, which is a continuation-in-part of application No. 14/986,455, filed on Dec. 31, 2015, now abandoned, which is a continuation-in-part of application No. 14/716,600, filed on May 19, 2015, now abandoned, which is a continuation-in-part of application No. 14/660,626, filed on Mar. 17, 2015, now Pat. No. 9,381,976.

(60) Provisional application No. 62/673,459, filed on May 18, 2018, provisional application No. 62/108,136, filed on Jan. 27, 2015, provisional application No. 62/107,704, filed on Jan. 26, 2015.

(51) Int. Cl.

| | |
|---|---|
| *H01R 13/73* | (2006.01) |
| *H01R 13/631* | (2006.01) |
| *H01R 13/622* | (2006.01) |
| *B63B 45/04* | (2006.01) |
| *H01R 33/94* | (2006.01) |
| *B63B 17/00* | (2006.01) |
| *B63B 34/20* | (2020.01) |
| *H02J 7/00* | (2006.01) |
| *H01R 13/52* | (2006.01) |
| *H01R 33/22* | (2006.01) |
| *B63B 34/26* | (2020.01) |

(52) U.S. Cl.
CPC ......... *H01R 13/622* (2013.01); *H01R 13/631* (2013.01); *H01R 13/73* (2013.01); *H01R 33/94* (2013.01); *H02B 1/20* (2013.01); *H02J 7/0042* (2013.01); *B63B 34/26* (2020.02); *B63B 2209/00* (2013.01); *H01R 13/5227* (2013.01); *H01R 33/22* (2013.01); *H01R 2201/26* (2013.01); *H02J 2310/42* (2020.01)

(58) Field of Classification Search
CPC .............. H01R 13/631; H01R 13/622; H01R 13/5227; H01R 33/22; F16M 11/28; F16M 13/02; F16M 13/00; F16M 11/14; F16M 11/041; F16M 11/24; A61M 5/1415; B63B 45/04; B63B 45/02; B63B 45/00; B63B 34/26; B63B 34/20; B63B 3/00; B63B 17/00; B63B 2209/00; F21V 19/02; F21V 21/22; F21V 21/26; F21V 21/088; F21V 21/0885; F21V 31/005; F21S 8/04; H02J 2310/42; H02J 7/0042; A01K 97/00; A01K 97/10; B60R 11/00; H02B 1/20; B63J 3/00
See application file for complete search history.

(56) References Cited

U.S. PATENT DOCUMENTS

| | | |
|---|---|---|
| 5,173,725 A | 12/1992 | Giles et al. |
| 5,331,990 A | 7/1994 | Hall et al. |
| 5,588,735 A | 12/1996 | Harada |
| 5,704,704 A | 1/1998 | Reichard et al. |
| 5,845,885 A | 12/1998 | Carnevali |
| 5,973,618 A | 10/1999 | Ellis |
| 6,244,759 B1 | 6/2001 | Russo |
| 6,368,157 B1 | 4/2002 | Bottazi et al. |
| 6,685,145 B2 | 2/2004 | Mackay et al. |
| 6,855,003 B1 | 2/2005 | Wyant |
| 7,017,598 B2 | 3/2006 | Nipke |
| 7,442,351 B2 | 9/2008 | Villani |
| D582,084 S | 12/2008 | Gebhard et al. |
| 7,500,881 B1 | 3/2009 | Lin |
| 7,862,197 B2 | 1/2011 | Gebhard |
| 8,011,930 B2 | 9/2011 | Lee et al. |
| 8,337,035 B2 | 12/2012 | Lu |
| 8,547,056 B2 | 10/2013 | Chang |
| 8,629,651 B2 | 1/2014 | Guccione et al. |
| 8,754,609 B2 | 7/2014 | Tsai et al. |
| 8,823,319 B2 | 9/2014 | Van Novak, III et al. |
| 8,873,233 B2 | 10/2014 | Reber et al. |
| 8,944,399 B2 | 2/2015 | Sutherland et al. |
| 9,381,976 B1 * | 7/2016 | Corley .................. A01K 97/00 |
| 10,312,706 B2 * | 6/2019 | Corley .................. H02J 7/025 |
| 10,344,924 B1 | 7/2019 | Ganahl |
| 10,787,239 B2 * | 9/2020 | Corley .................. B63B 34/20 |
| 2004/0257822 A1 | 12/2004 | Hopkins |
| 2007/0279922 A1 | 12/2007 | Villani |
| 2009/0255561 A1 | 10/2009 | Brown |
| 2010/0130065 A1 | 5/2010 | Teague |
| 2012/0013790 A1 | 1/2012 | Chu |
| 2013/0278207 A1 | 10/2013 | Yoo |
| 2014/0030929 A1 | 1/2014 | Cracco |
| 2014/0210406 A1 | 7/2014 | Na et al. |
| 2015/0002088 A1 | 1/2015 | D'Agostino |
| 2015/0316837 A1 | 11/2015 | Maltese |
| 2015/0344116 A1 | 12/2015 | McLeroy |
| 2015/0346590 A1 | 12/2015 | Lewis |
| 2015/0351531 A1 | 12/2015 | Dalton |

OTHER PUBLICATIONS

Excel-outdoors.com, "Power Plug", http://excel-outdoors.com/products/excel-outdoors-power-plug, 2015.
Gander Mountain, "Goal Zero Switch 8 Power Source", http://www.gandermountain.com/modperl/product/details.cgi?pdesc=Goal-Zero-Switch-8-Power-Source&i=785207&r=view&cvsfa=2586&cvsfe=2&cvsfhu=373835323037&kpid=785207&gclid=Cj0KEQjwrPqnBRD56dGe1o_WIZsBEiQAb5ugtwROQCsK253KG-HoDs-32QpQu-N5XQcy4WFOLIA5B9QaAo_18P8, 2013.
Gizmag.com, "The Slik-Stik nexgen high-tech walking stick", http://www.gizmag.com/the-slik-stik-nexgen-high-tech-walking-stick/11293/, Mar. 20, 2009
Kayalu Gear, "'General Info about the Radpole Assembly'", http://www.kayalu.com/k/radpole-portable-ram-mounts-navigation-kayak-light-camera-mount-fishing-pole-mount_page_2.php, 2015, 1-3.
R & R Associates, "The New Generation Cane", http://www.mrassociates.com/wordpress/the-new-generation-cane/, Mar. 7, 2013.
Seachoice Products, "2012 Marine Accessories Catalog", http://www.seachoice.com/products, 2012, 8.

* cited by examiner

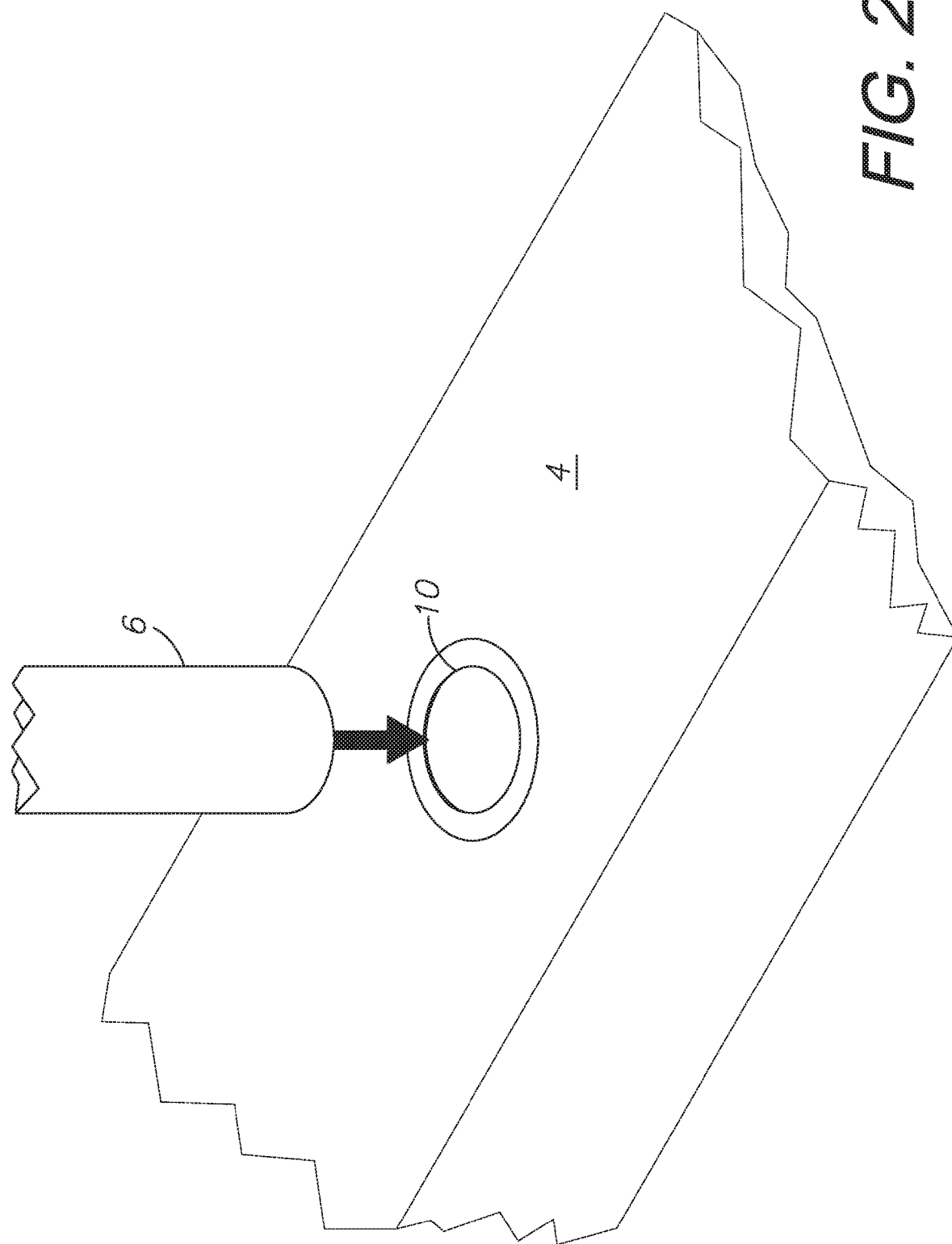

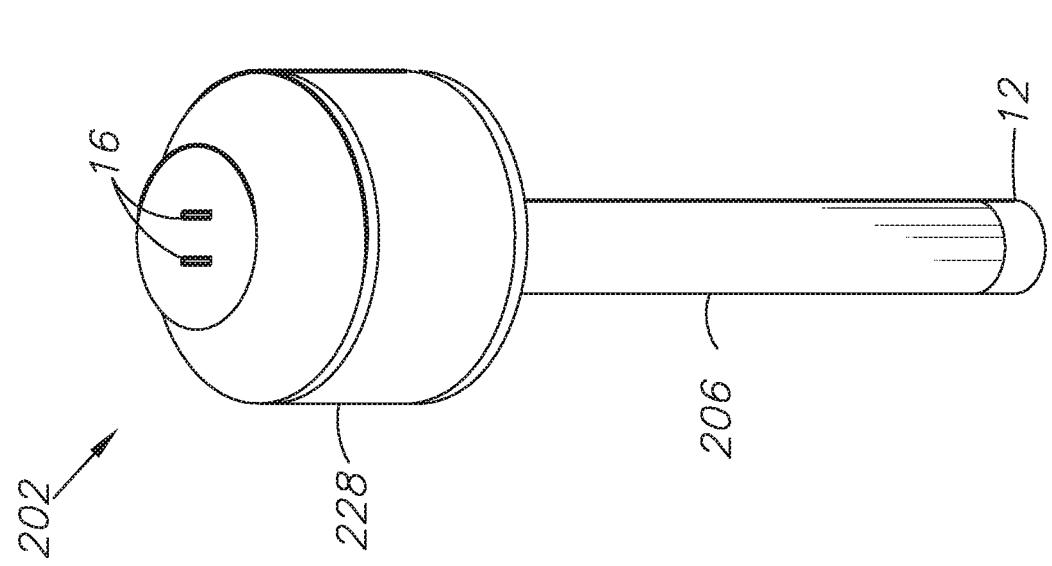
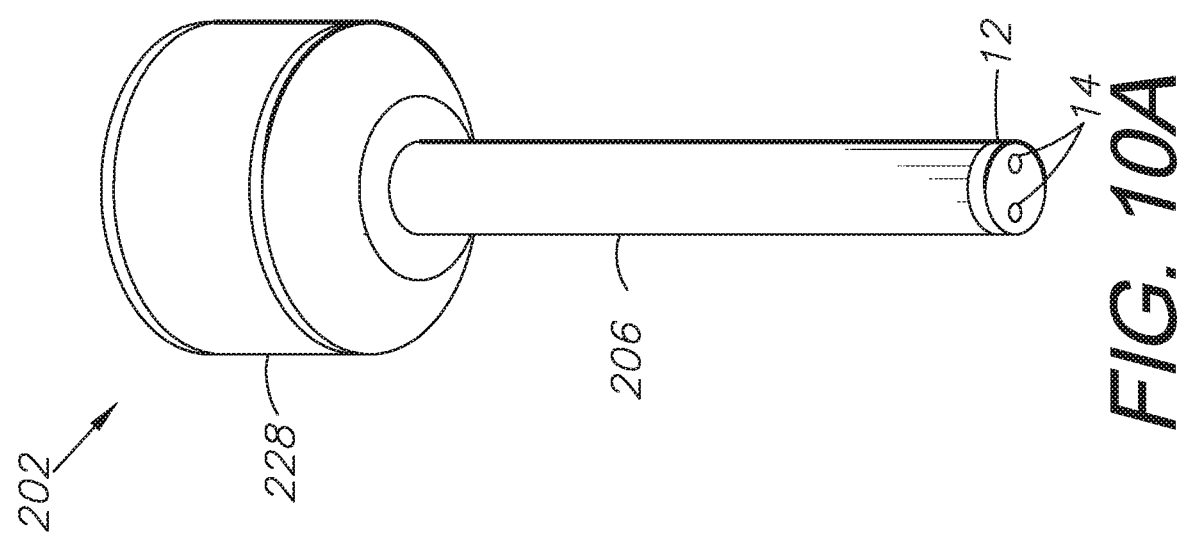

ANCHOR AND MOTOR CAP WITH LIGHT AND CAMERA MOUNT

CROSS-REFERENCE TO RELATED APPLICATIONS

This application is a divisional application of and claims priority in U.S. patent application Ser. No. 16/410,068 filed May 13, 2019, which is a continuation-in-part of and claims priority in U.S. patent application Ser. No. 15/812,882 filed Nov. 14, 2017, now U.S. Pat. No. 10,312,706 which claims priority in U.S. Provisional Patent Application No. 62/507,306, filed May 17, 2017, which is a continuation-in-part of and claims priority in U.S. patent application Ser. No. 15/184,721, filed Jun. 16, 2016 now U.S. Pat. No. 9,981,723, which is a continuation-in-part of and claims priority in U.S. patent application Ser. No. 14/986,455, filed Dec. 31, 2015, which is a continuation-in-part of and claims priority in U.S. patent application Ser. No. 14/716,600, filed May 19, 2015, which is a continuation-in-part of and claims priority in U.S. patent application Ser. No. 14/660,626, filed Mar. 17, 2015, now U.S. Pat. No. 9,381,976, issued Jul. 5, 2016, which claims priority in U.S. Provisional Patent Application No. 62/108,136, filed Jan. 27, 2015, and also claims priority in U.S. Provisional Patent Application No. 62/107,704, filed Jan. 26, 2015, all of which are incorporated herein by reference.

BACKGROUND OF THE INVENTION

1. Field of the Invention

The present invention relates generally to an anchor cap and method for use thereof, and more specifically to a boat anchor cap with a light, power port, and accessory mount for mounting cameras or other mobile electronic accessories.

2. Description of the Related Art

Many boating enthusiasts, from professional bass fisherman such as Casey Scanlon, to extreme water sport performers, desire to record their sporting feats using cameras such as GoPro® cameras manufactured by GoPro, Inc. of San Mateo, Calif. and other action cameras, including but not limited to the Garmin Virb®, manufactured by Garmin Ltd. of Olathe, Kans. Other more casual boating enthusiasts, such as Roger Corley, may wish to similarly record family activities, charge mobile computing devices, or otherwise provide power to accessories or method of attachment for accessories while on a marine vessel.

Presently there are capabilities of providing power to mobile accessories using 12V ports (a.k.a. cigarette lighters). However, many boats, and certainly most older boats, lack such a power port. Similarly, when that power port exists in a boat, it typically is located near the steering column and not near the rear and/or front of the boat where activity generally occurs.

Shallow-water anchors such as the Talon anchor manufactured by Johnson Outdoors, Inc. of Racine, Wis. and disclosed in U.S. Pat. No. 8,381,671 which is incorporated herein by reference, are mounted to boats. Existing products such as the anchor light manufactured by Russell Marine Products of El Dorado, Kans. can be mounted to the Talon anchor, however these products are limited to only providing a light.

Heretofore there has not been available a system or method for an anchor cap with the advantages and features of the present invention.

SUMMARY OF THE INVENTION

The present invention generally provides an anchor cap with a light, camera mount, and power port such as a universal serial bus (USB) port for charging electrical accessories or for providing power to a camera mounted to the camera mount. This incorporates elements of monopods for powering and mounting electrical and non-electrical accessories and attachment methods such as those disclosed by U.S. Pat. No. 9,381,976, which has the same applicant as the present application and is incorporated herein by reference.

An alternative embodiment functions to similarly use a motor cap to receive the monopod for providing the same features as the anchor cap.

BRIEF DESCRIPTION OF THE DRAWINGS

The drawings constitute a part of this specification and include exemplary embodiments of the present invention illustrating various objects and features thereof.

FIG. 2 is a detailed isometric view thereof, taken about the circle on FIG. 1.

FIG. 10A is an isometric view from the base of yet another alternative embodiment of the present invention.

FIG. 10B is an isometric view from the top thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate.

Additional examples including a mobile smart device including a display device for viewing a typical web browser or user interface will be commonly referred to throughout the following description. The type of device, computer, display, or user interface may vary when practicing an embodiment of the present invention. Said terminology will include the words specifically mentioned, derivatives thereof and words of similar meaning.

Power providing inputs in the embodiment of the invention may encompass any format of Uniform Serial Bus (USB) input, 12V input, or any other type of power adapter. However, the embodiment of the present invention is intended only to be inserted into the navigation light port located on a marine vessel. The marine vessel applies to any type of boat, ship, or any other waterborne vessel which encompasses a navigation light port. A standard navigation light port is considered to be a port on a marine vessel which is required by the International Regulations for Preventing Collisions at Sea.

II. Preferred Embodiment Marine Monopod System 2

Figure 1:
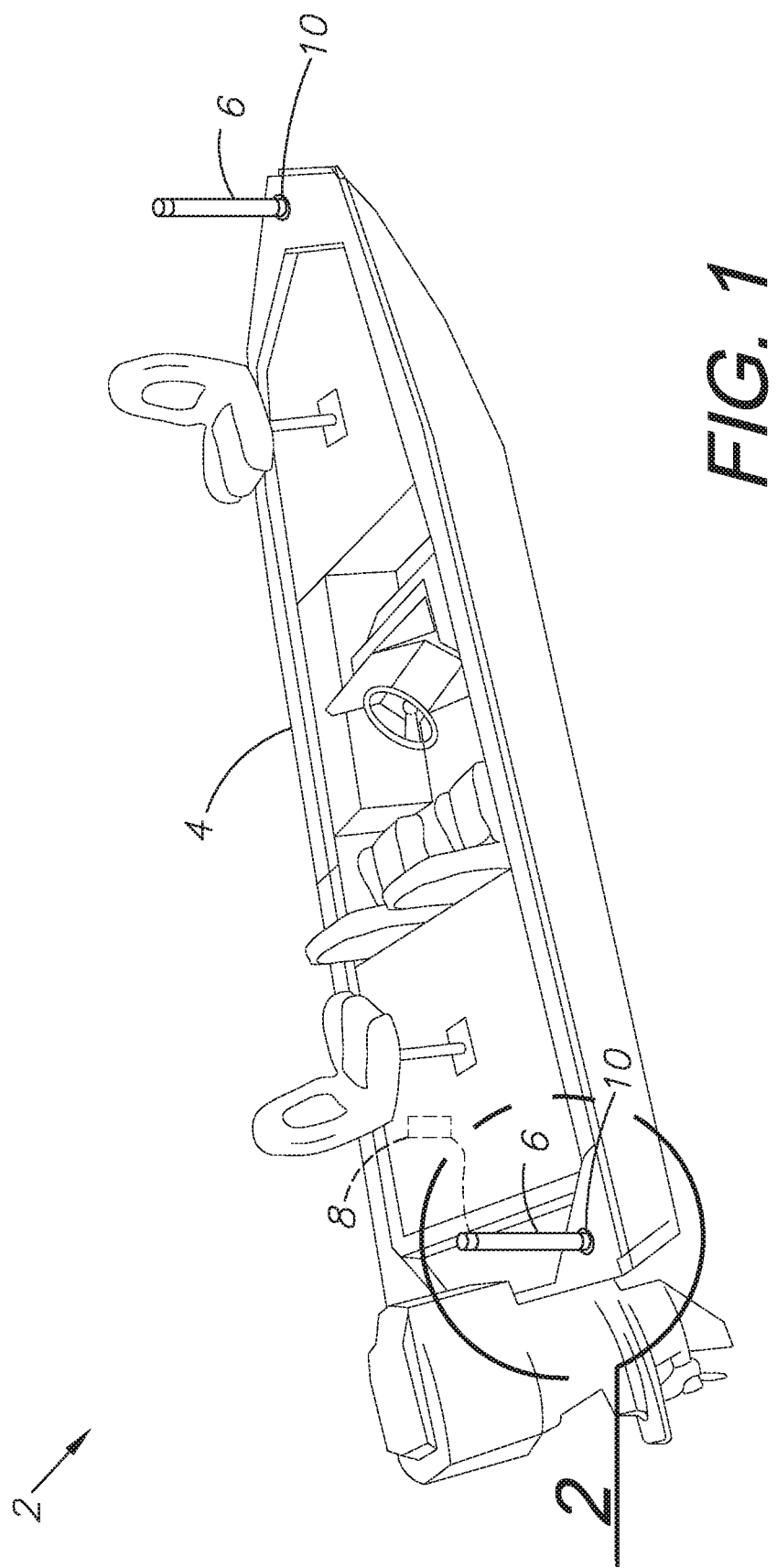
FIG. 1 is an isometric view of an embodiment of the present invention located in a typical environment in which it may be deployed, herein depicted as a bass fishing boat.

Referring to the figures in more detail, FIG. 1 shows a marine vessel 4 employing a marine monopod system 2. The monopod system 2 includes a monopod 6 which is inserted into a navigation light power port 10 and draws power from the port for electronic devices 8, such as smart phones, cameras, global positioning system (GPS) devices, and other mobile electronic devices. Note that a second navigation light power port 10 is located at the front of the vessel 4, which may accommodate a second monopod 6. Other ports may be located in other locations around the vessel.

Figure 3B:
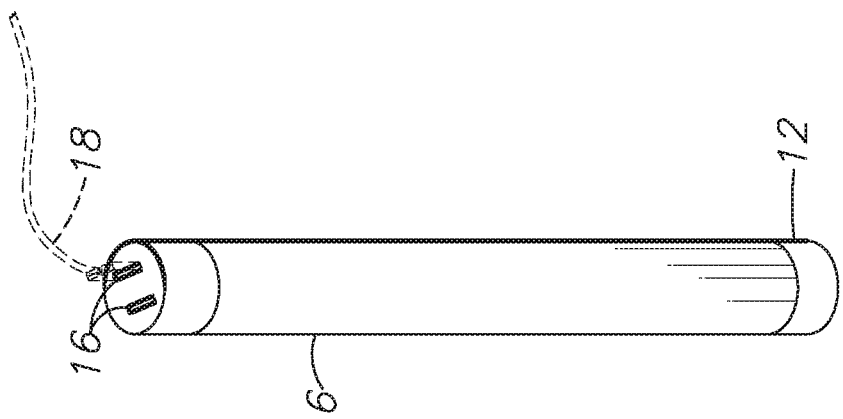
FIG. 3B is an isometric view from the top thereof.
Figure 3A:
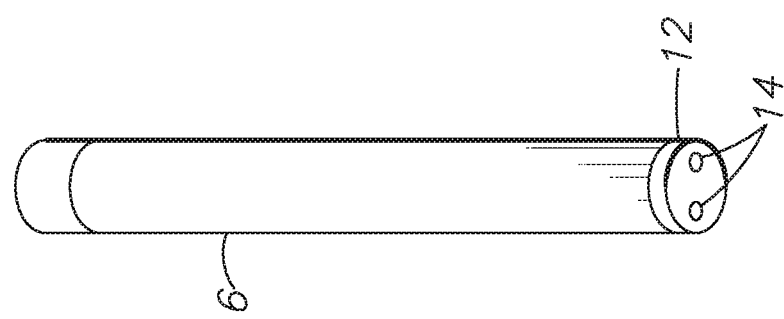
FIG. 3A is an isometric view from the base of an embodiment of the present invention.

FIG. 2 shows a closer view of the monopod 6 being inserted into the power port 10. FIGS. 3A and 3B show more detail of the monopod 6. This embodiment includes a monopod base 12 with contacts 14 for drawing power from the power port 10. A pair of Universal Serial Bus (USB) ports 16 are shown on the top portion of the monopod. Cables 18 for charging mobile devices may be inserted into these ports, and power is drawn from the power port 10. Other types of power adapters, such as 12V adapters, may be used instead of USB ports.

Figure 4:
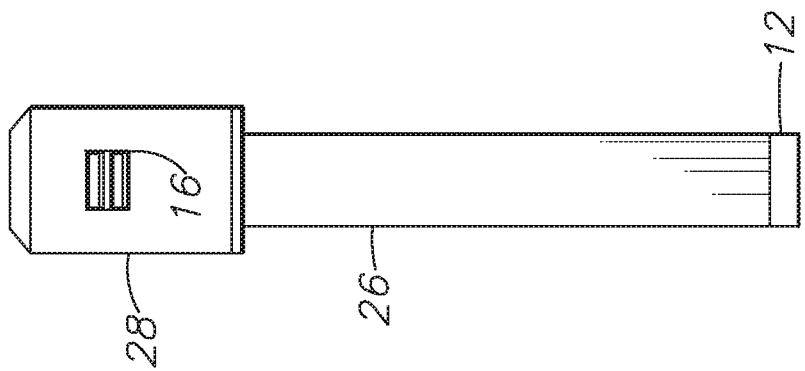
FIG. 4 is a front elevational view of an alternative embodiment thereof.

FIG. 4 shows an alternative embodiment monopod 26 which includes a head portion 28 with the USB ports 16 mounted on one or more sides of the head portion.

III. Alternative Embodiment Marine Monopod System 52

Figure 5:
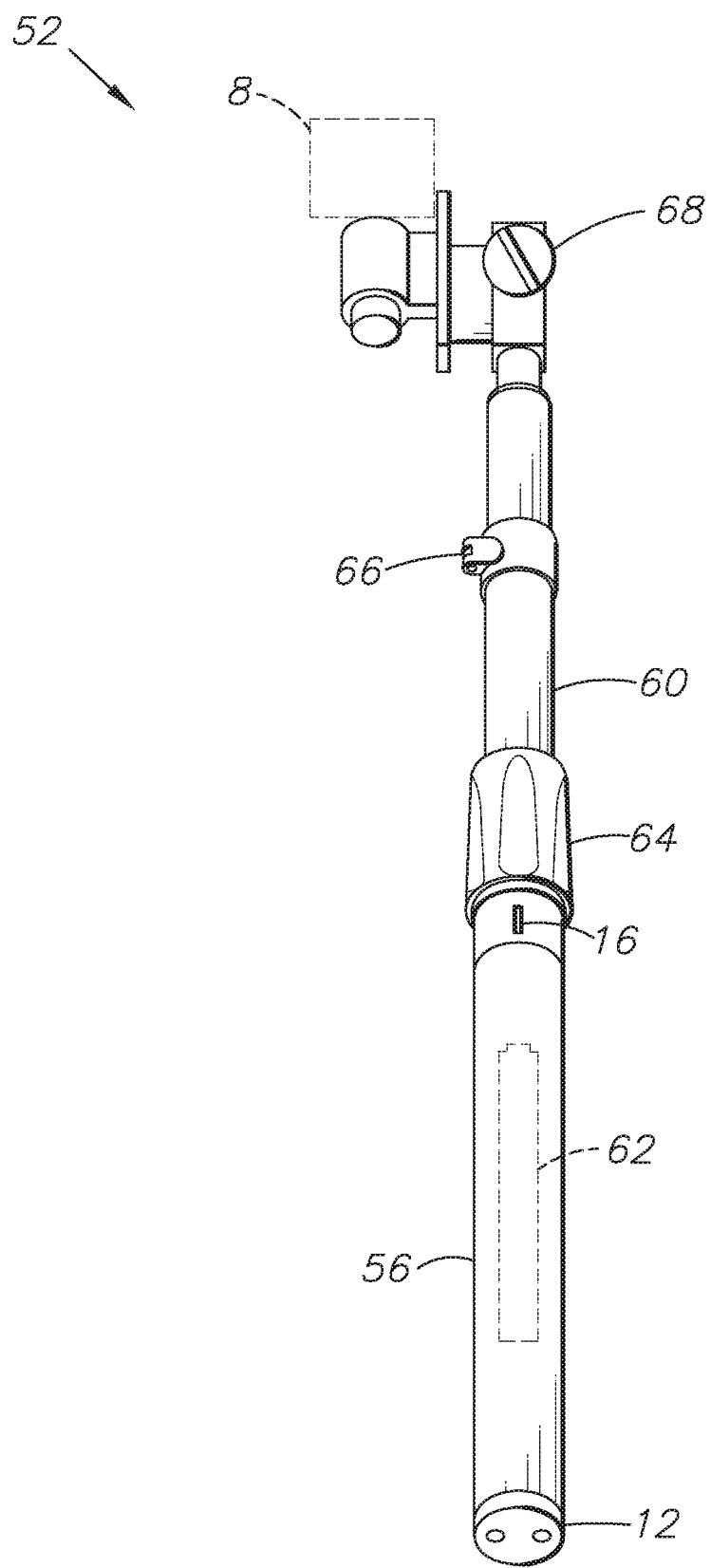
FIG. 5 is an isometric view of another embodiment of the present invention.

FIG. 5 shows an alternative marine monopod system 52 which uses a base monopod 56 with a telescoping arm 60 capable of extending a few inches or several feet above or away from the marine vessel. The monopod 56 includes the same base 12 for connecting with the navigation light port 10 and at least one USB port 16 for powering an accessory 8. Here, it is likely that the accessory is a camera for capturing video images, but the accessory could be any electronic device.

The telescoping arm 60 may be connected to the base monopod 56 with an adjustable handle 64 which tightens or loosens to allow telescoping of the arm 60. Other means may be employed which allow the arm to telescope. A second telescoping motion may be employed by releasing a locking device 66 at a second point along the arm 60. This locking device as shown can be quickly unlocked or locked using one finger.

The base monopod 56 may include a rechargeable battery 62, allowing the monopod to power or charge a device 8 even when it is not inserted into the navigational light port 10. An accessory mount 68, such as the screw-based camera mount shown here, may be connected to the top of the telescoping arm 60.

IV. Alternative Embodiment Monopod System 102

Figure 6:
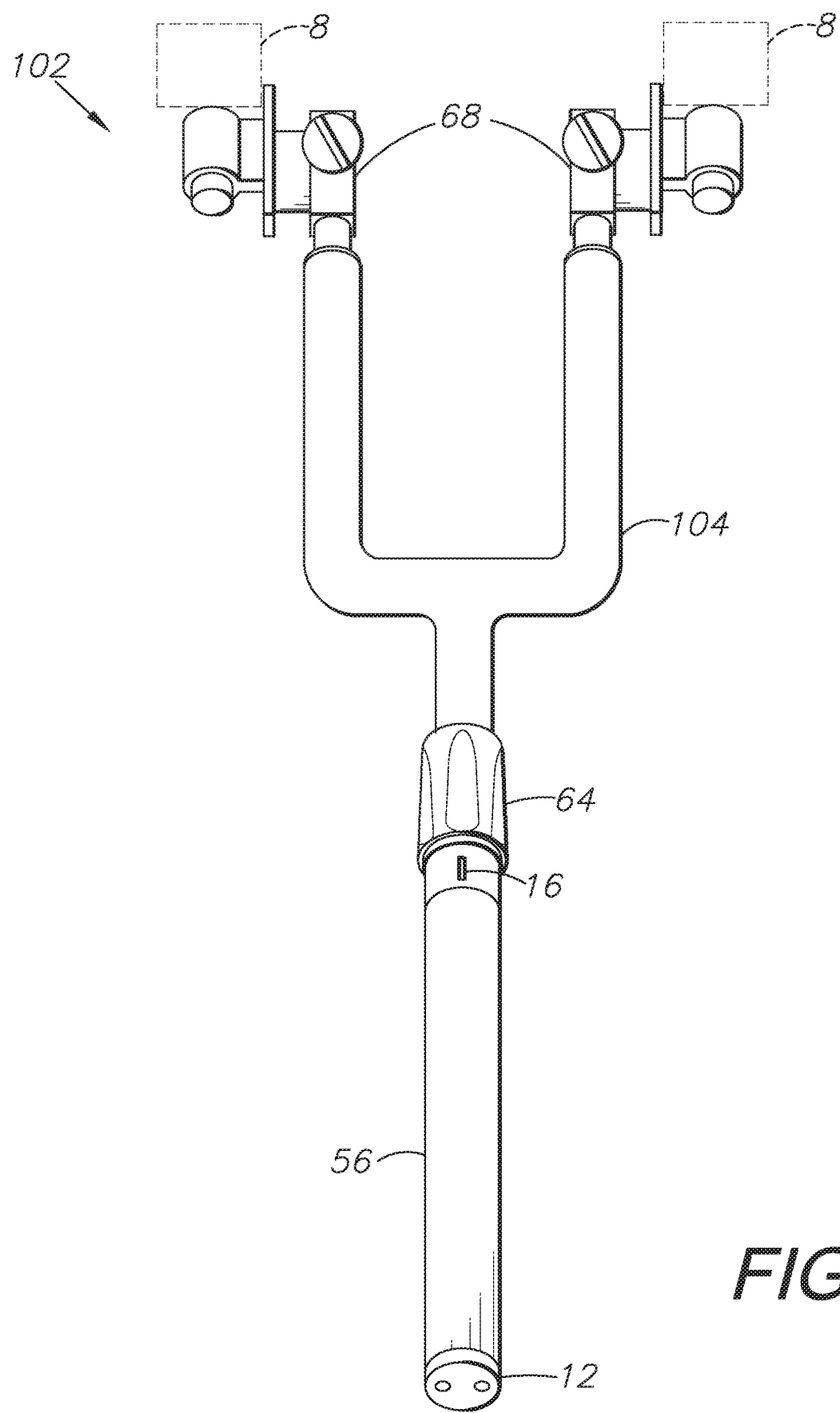
FIG. 6 is an isometric view of yet another embodiment of the present invention.

FIG. 6 employs many of the same features as the system 52 described above, but instead of the telescoping arm 60 of system 52, this system employs a forked arm 104 which is connected to the base monopod 56, and which allows for two devices to be connected to the same monopod system 102. In this way, one camera could face forward while the other faces away. Alternatively, two devices could charge simultaneously while being used.

V. Alternative Embodiment Monopod System 152

Figure 7:
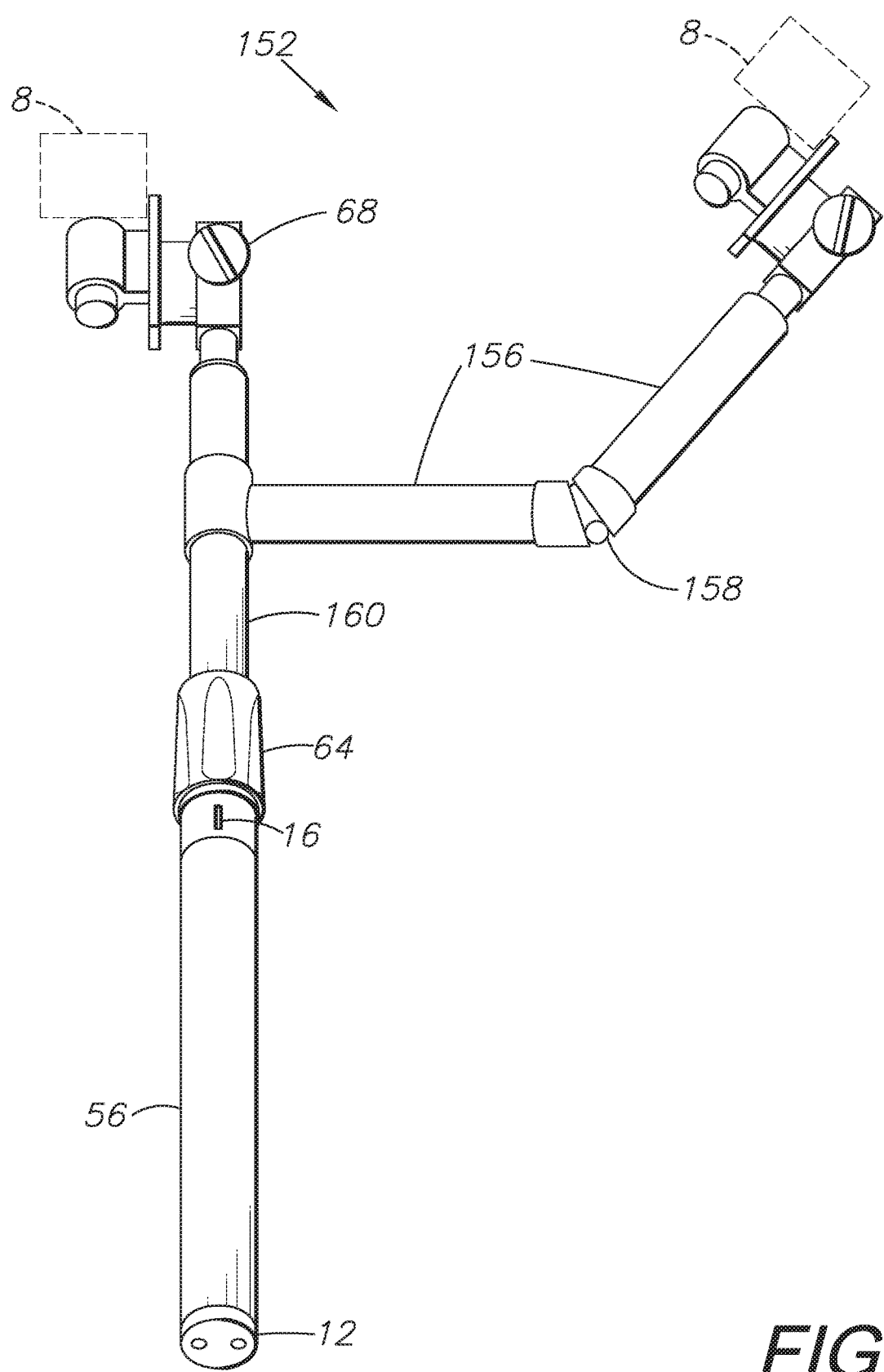
FIG. 7 is an isometric view of yet another embodiment of the present invention.

FIG. 7 shows an alternative embodiment monopod system 152 which uses the same base monopod 56 setup as systems 52 and 102, but which includes a telescoping arm 160 which allows an extension arm 156 to connect to the telescoping arm 160, either using a clip, a connecting ring, or some other connecting device. The extension arm 156 may culminate at an elbow 158, which may connect to a second extension arm 156 as shown. This type of connection could occur several times. It is important that the elbow 158 contain significant resistance against being bent such that the arms 156 retain any angle they are set at. This allows for dynamic camera angles using cameras as the electrical accessories. For example, in a boat, the extension arm 156 could place a camera close to the water as the boat moves through the water, while the other camera is placed far above the boat. The two cameras would capture video simultaneously.

Additional extension arms may be placed for two, three, four, or more camera angles.

Figure 8:
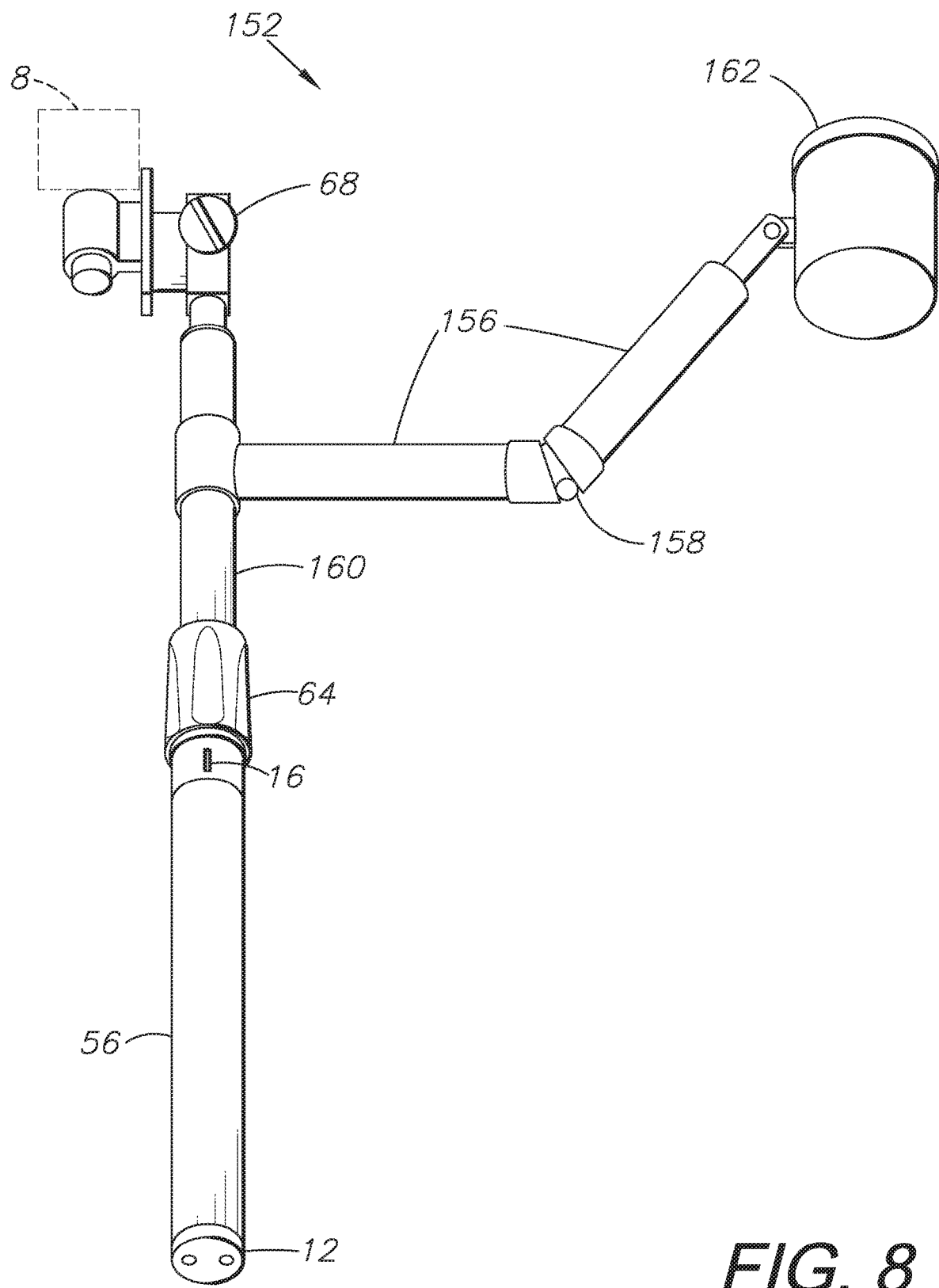
FIG. 8 is an alternative isometric view thereof, showing a cup holder accessory.
Figure 9:
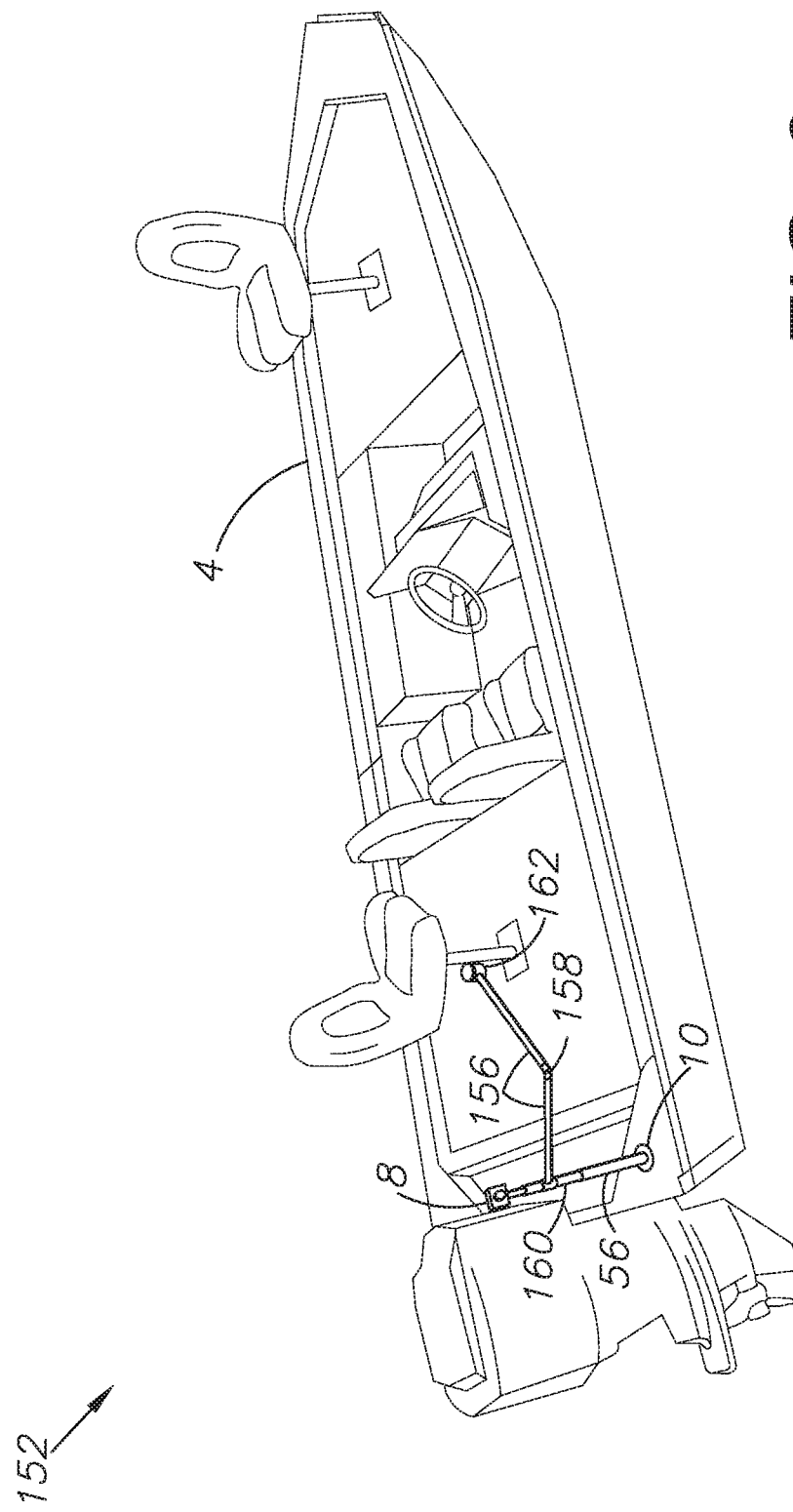
FIG. 9 is an isometric view of the embodiment of FIG. 8 located in a typical environment in which it may be deployed, herein depicted as a bass fishing boat.

Alternatively, as shown in FIG. 8, the accessory may instead be a cup holder 162. It is common for bass fishing boats or older boats to lack sufficient space to store drinks, especially when a fisherman is in the fishing seat. FIG. 9 shows how the arm can be positioned to provide a cup holder to the fisherman while a camera is still filming from atop the telescoping arm 160.

VI. Alternative Embodiment Monopod System 202

FIGS. 10A and 10B employ a monopod 206 which includes a basic navigational lamp 228 atop the monopod 206. As shown, two USB ports 16 are located atop the lamp. However, the USB ports could be placed along the sides of the monopod 206, and an accessory mount, such as those shown in FIGS. 5-8 above, may be placed atop the lamp. This would allow for a camera to be mounted to the navigational lamp and filming to take place even while the navigational light is in use or at night.

It should be noted that any and all commercial electronic devices could benefit from the present invention. GPS devices, fish finders, and tablet computers would be at the fisherman's fingertips using one or more of the embodiments of the present invention without the fisherman leaving the fishing chair.

VII. Wireless Power Source Monopod System 302

Figure 11:
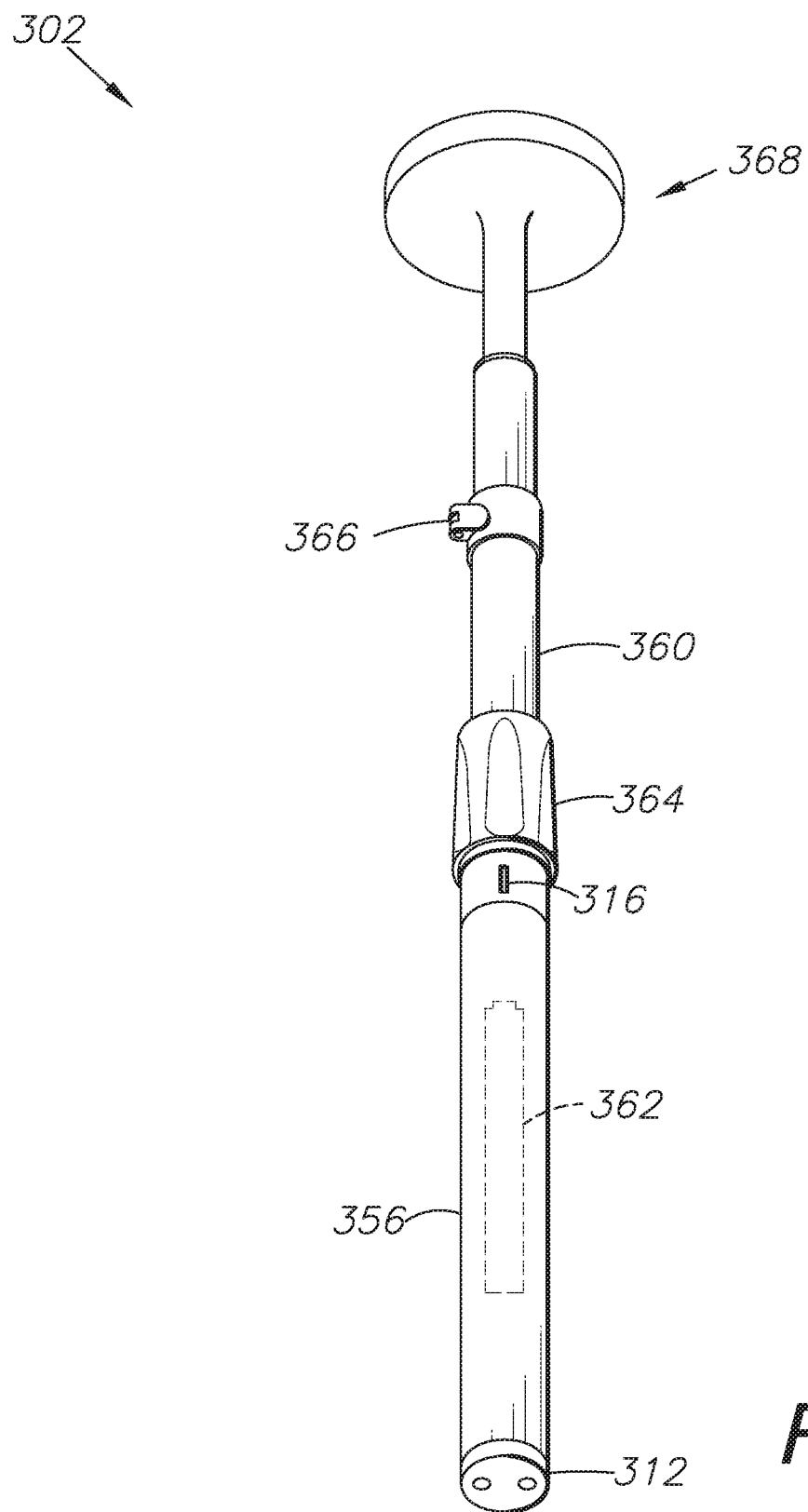
FIG. 11 is a bottom-up isometric view of an alternative embodiment of the present invention.
Figure 12:
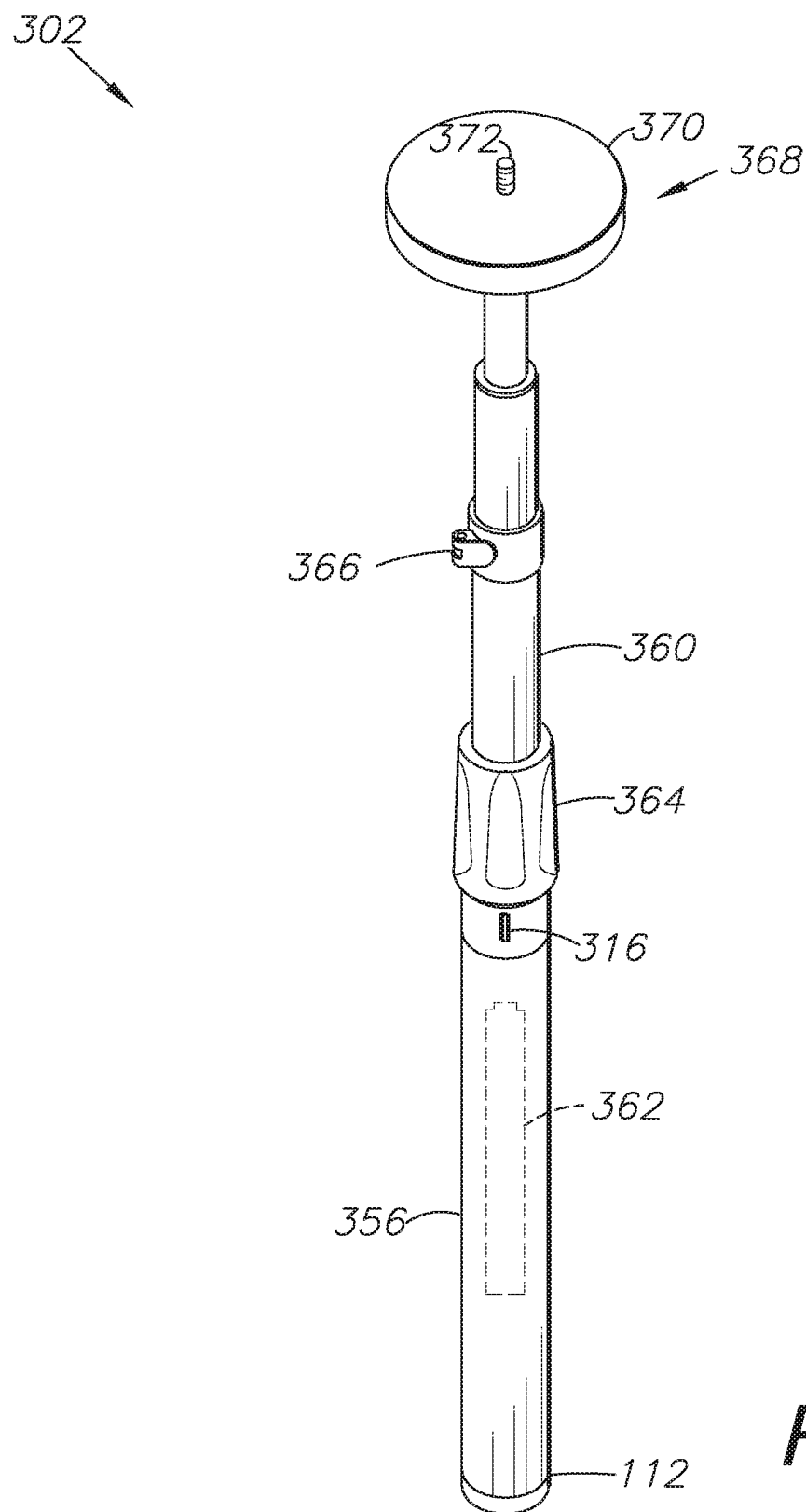
FIG. 12 is a top-down isometric view thereof.

FIGS. 11-15B show another alternative embodiment system which includes wireless power for powering an electrical accessory, such as a camera as discussed above. As shown in FIGS. 11-12, a monopod 356 having a telescoping arm 360 includes a battery power source 362, a charging port 312 which may or may not interface with a navigation light port of a watercraft, and locking elements 366 for locking the telescoping arm 360 at various lengths. The monopod may or may not include a USB port 316 or other port for charging of electrical accessories. A preferred embodiment may include an adjustable handle 364 for extending and retracting the telescoping arm 360.

This embodiment also includes a wireless power delivery system 368 connected to the end of the telescoping arm 360. The primary features of this delivery system 368 are shown in FIG. 12 and include a base 370 and a mounting screw 372, such as typically used to mount cameras or camera cases to monopods or tripods.

Figure 14:
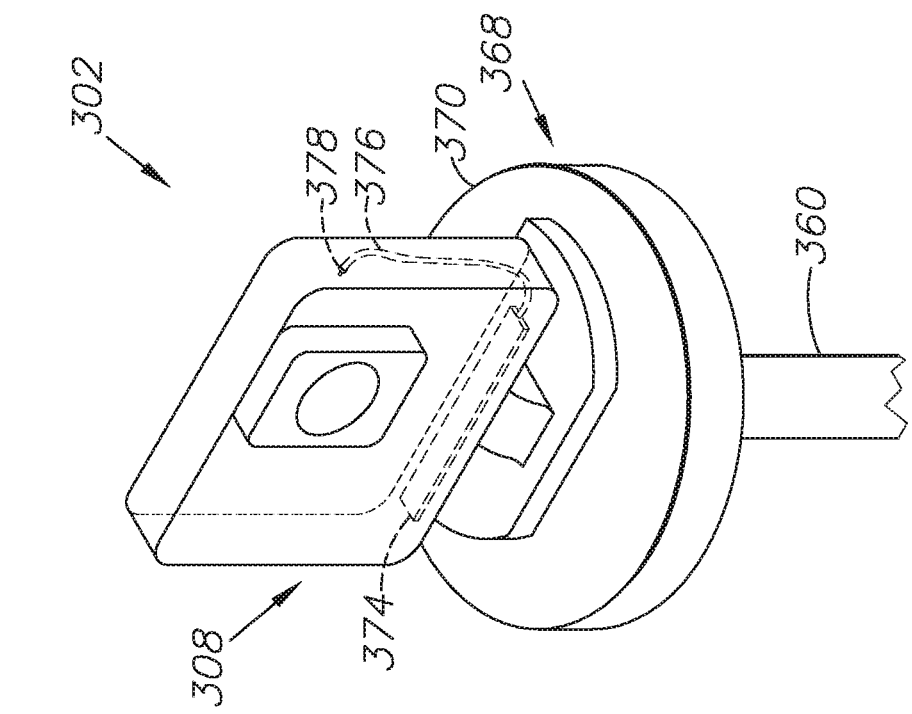
FIG. 14 is an isometric view indicating the connection of elements thereof.
Figure 13:
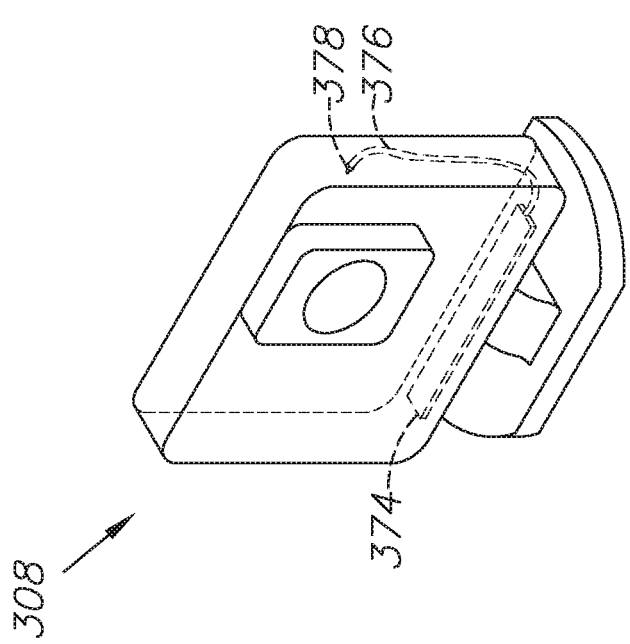
FIG. 13 is an isometric view of elements thereof.

FIG. 13 shows a typical camera housing accessory 308 which would be used to house cameras, such as those disclosed above. The camera housing accessory 308 is designed to mount to the mounting screw 372 of the wireless power delivery system 368. A receiver strip 374 connects to the camera or other electrical accessory via a cord 376 and interface 378. FIG. 14 shows how the camera housing accessory 308 mounts to the base 370 of the wireless power delivery system. In a preferred embodiment the camera housing accessory 308 would be waterproof.

Figure 15B:
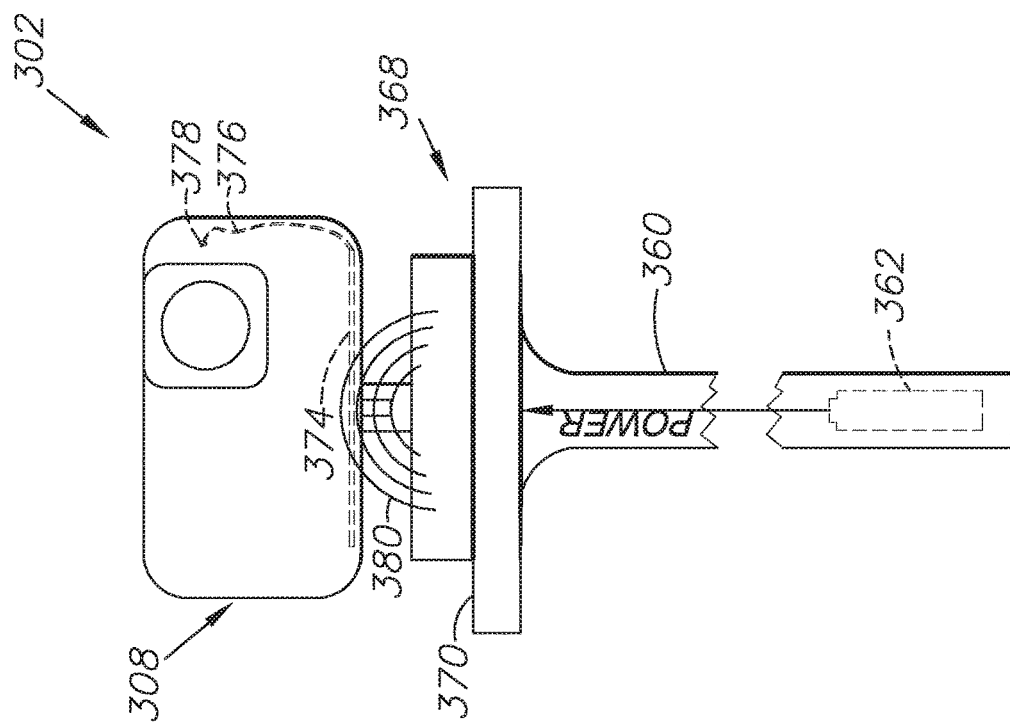
FIG. 15B is a diagrammatic elevational view thereof, wherein the two elements of FIG. 15A are connected.
Figure 15A:
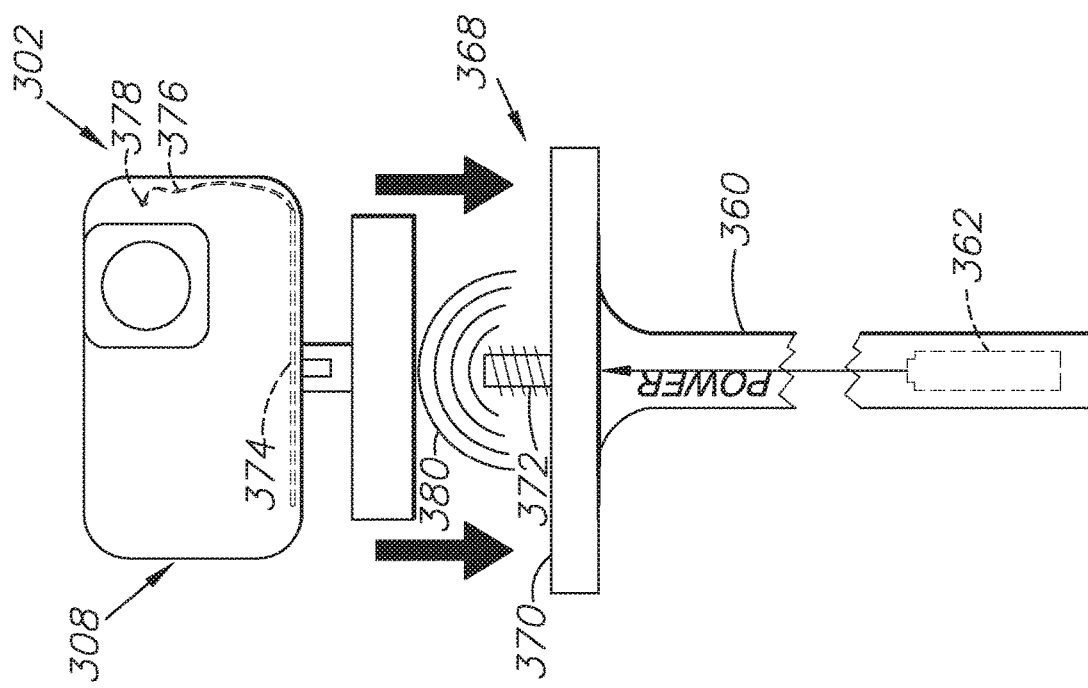
FIG. 15A is a diagrammatic elevational view thereof, showing two elements being connected.
Figure 16:
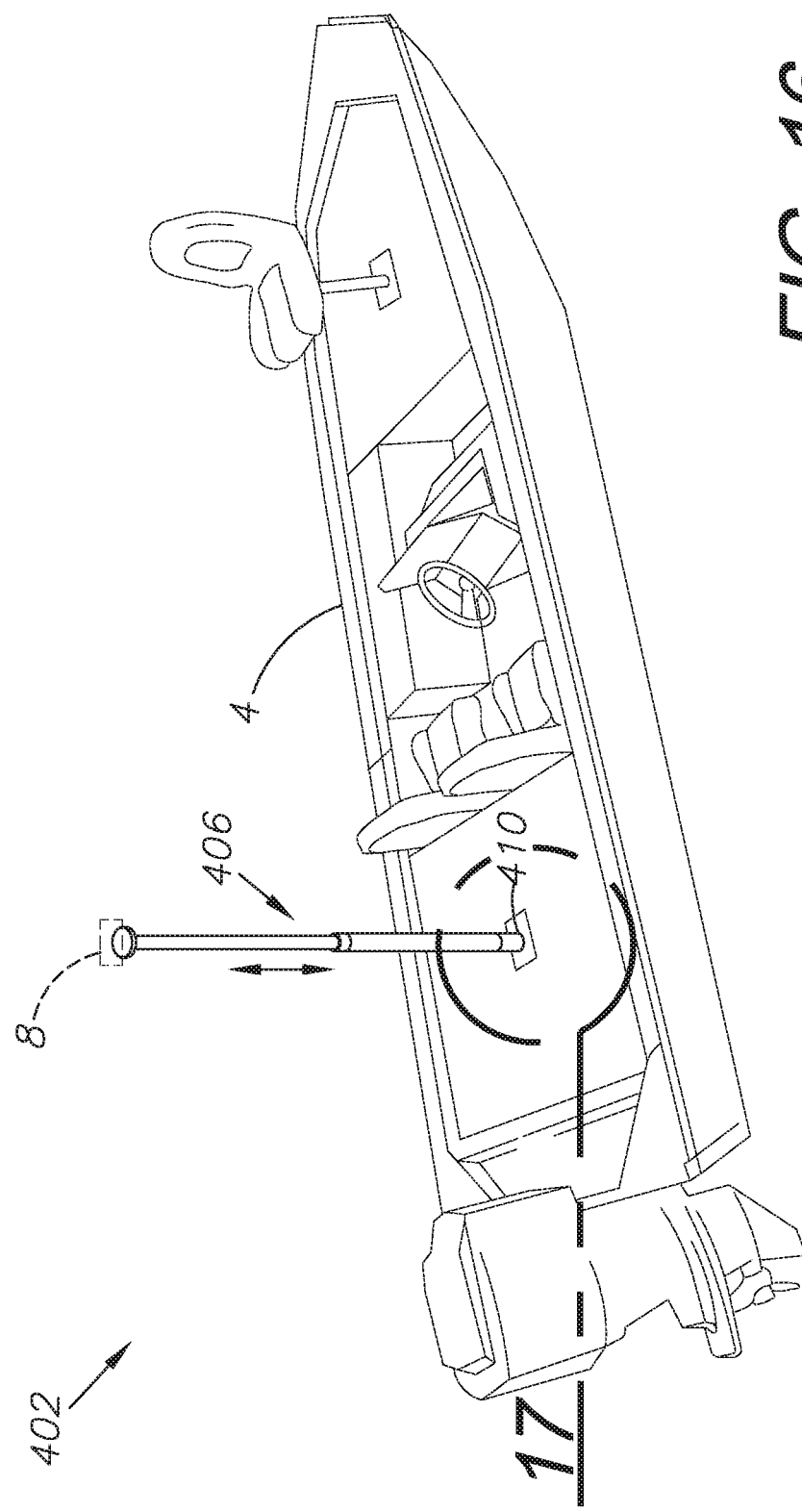
FIG. 16 is an isometric view of another alternative embodiment of the present invention located in a typical environment in which it may be deployed, herein depicted as a bass fishing boat.
Figure 17:
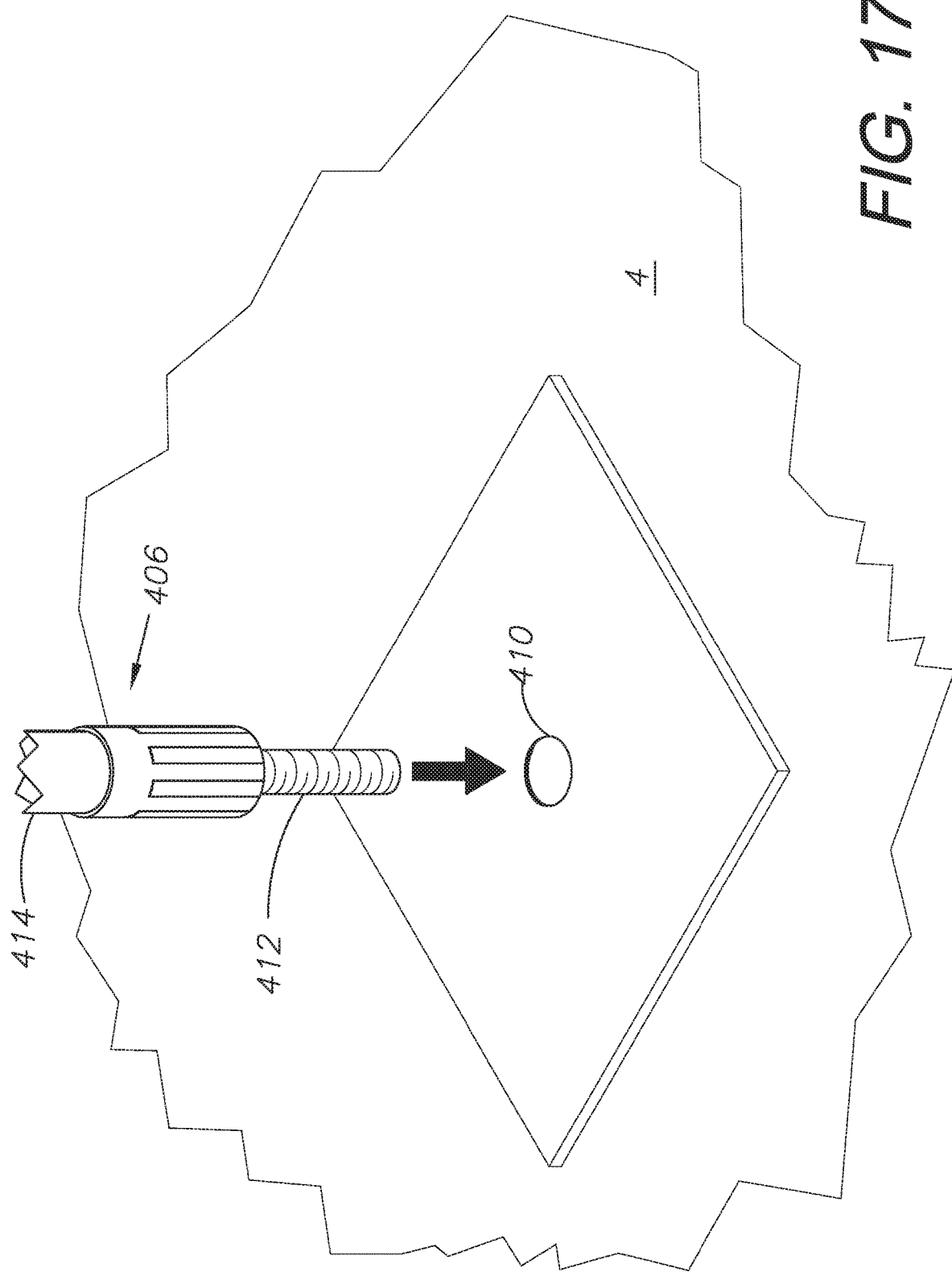
FIG. 17 is a detailed isometric view thereof, taken about the circle on FIG. 16.
Figure 18:
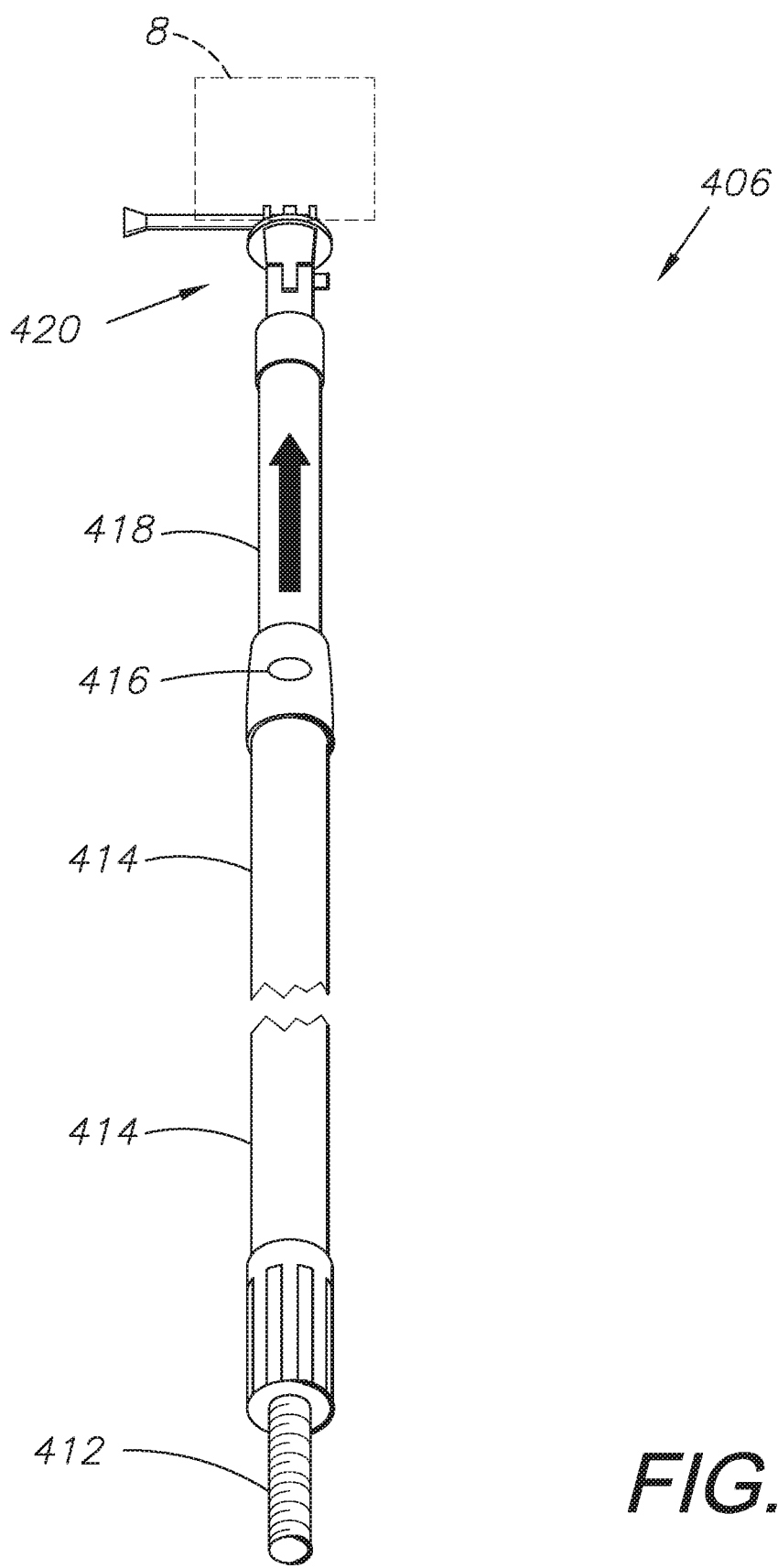
FIG. 18 is an isometric view from the base of the alternative embodiment thereof.
Figure 19:
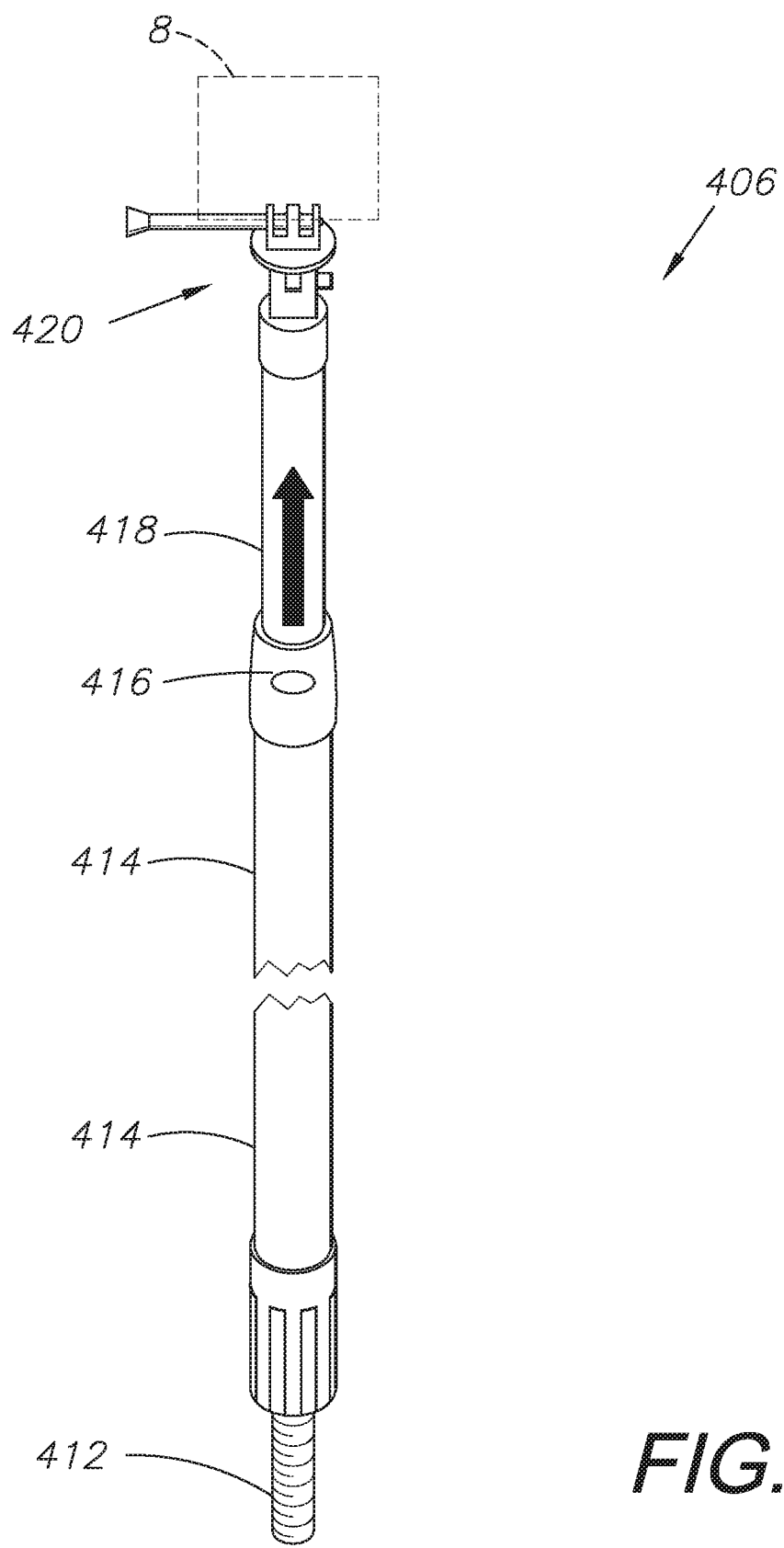
FIG. 19 is an isometric view from the top of the alternative embodiment thereof.

The wireless power delivery system 368 draws power from the battery source 362 of the monopod 356 as shown in FIG. 15A. The delivery system 368 delivers wireless power 380 in a limited range about the base 370, typically less than six inches from the base. As shown in FIG. 15B, when the accessory 308 is attached to the delivery system 368, the wireless power 380 is received by the receiver strip 374 and is delivered to the camera or other electrical accessory via the power cord 376 and interface 378. This wireless power then powers the electrical accessory when in use, and passively charges a battery associated with the electrical accessory, if any, when the accessory is not in use. It should be noted that any and all types of electrical accessories mentioned herein or otherwise requiring electrical power could utilize this arrangement of elements.

In an embodiment of this invention, an ergonomic handle may be located just beneath the wireless power delivery system 368, converting the monopod device into a walking or hiking stick.

VIII. Telescoping Monopod Seat-Mount System 402

FIGS. 16-19 show yet another alternative embodiment of the present invention. Here, as in previous embodiments, a telescoping monopod 406 is deployed in a boat 4 and is used to house a portable electronic accessory 8 such as a camera. The base 412 of the monopod 406 screws into or is otherwise inserted into a seat mount 410 within the deck of the boat 4. The base as shown is threaded, but may not necessarily be threaded.

The monopod 406 includes a bottom arm 414 and a top arm 418. The top arm 418 telescopes from within the bottom arm 414 and is released and/or locked via a release switch 416 or other similar feature. A mounting accessory 420 for mounting the portable electronic accessory 8.

The telescoping monopod 406 extends from approximately four feet (4') long to approximately eight feet (8') long or longer. This provide superior angles for filming action on the boat 4 using a camera mounted to the mounting accessory 420 at the top of the telescoping monopod 406.

Figure 20:
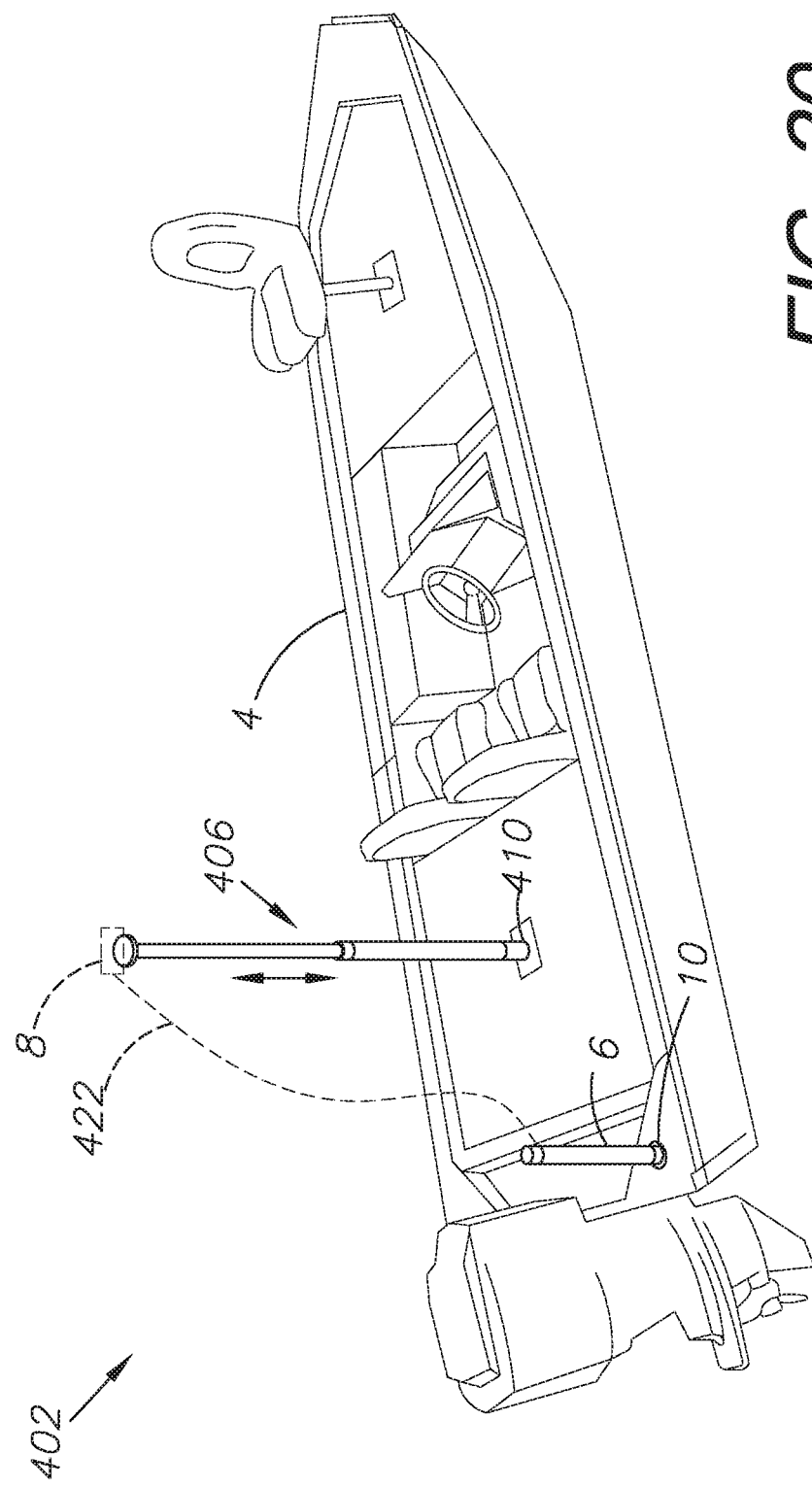
FIG. 20 is an isometric view thereof showing the embodiment interacting with the embodiment shown in FIG. 1.

FIG. 20 shows this embodiment telescoping monopod seat-mount system 402 interacting with the embodiment shown in FIG. 1, thereby providing electrical power for recharging and/or operating the portable electronic accessory 8 via a cord 422.

IX. Monopod Light Source System 502

Figure 21:
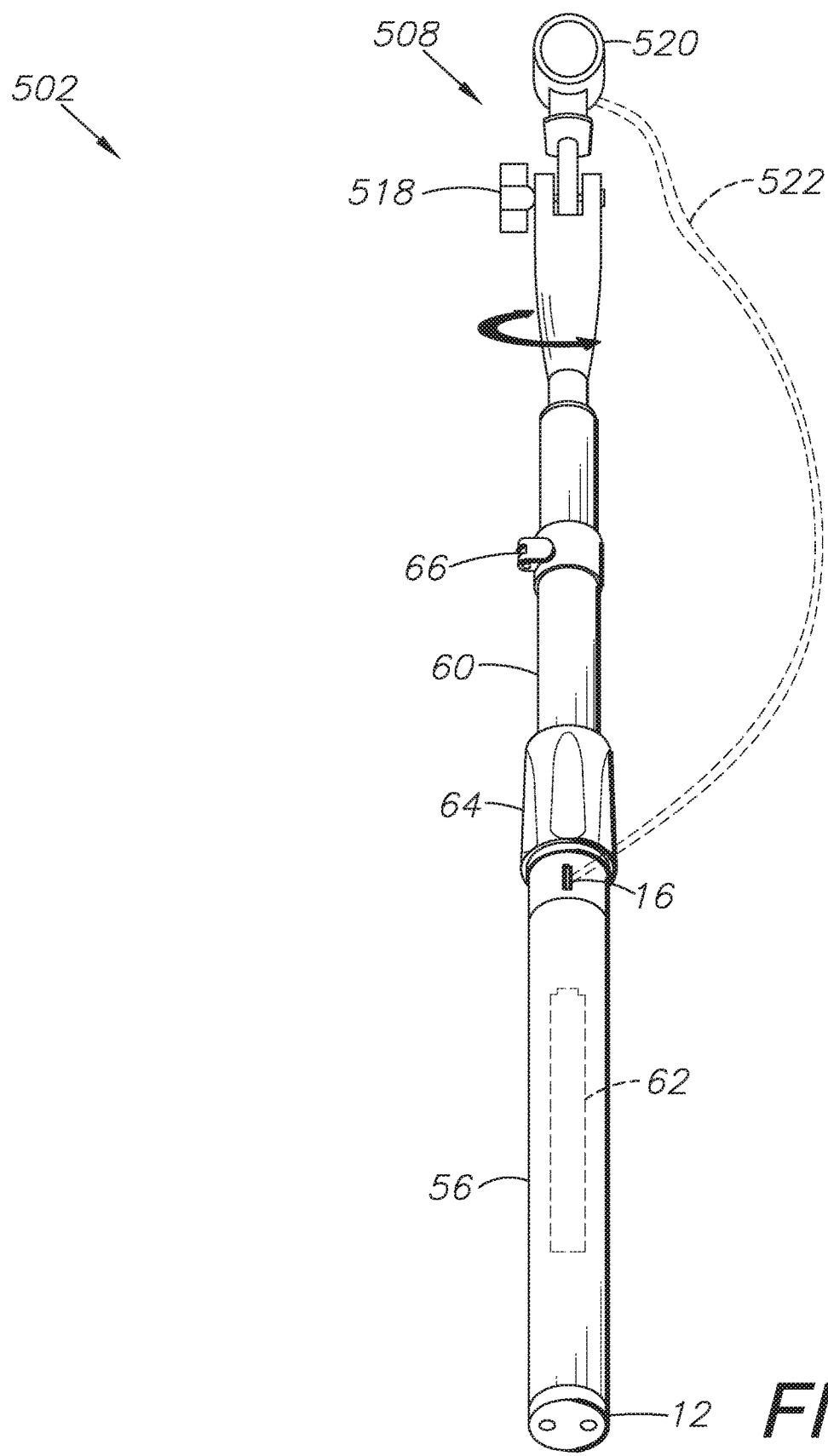
FIG. 21 is an isometric view of an alternative embodiment of the present invention including a light accessory.
Figure 22:
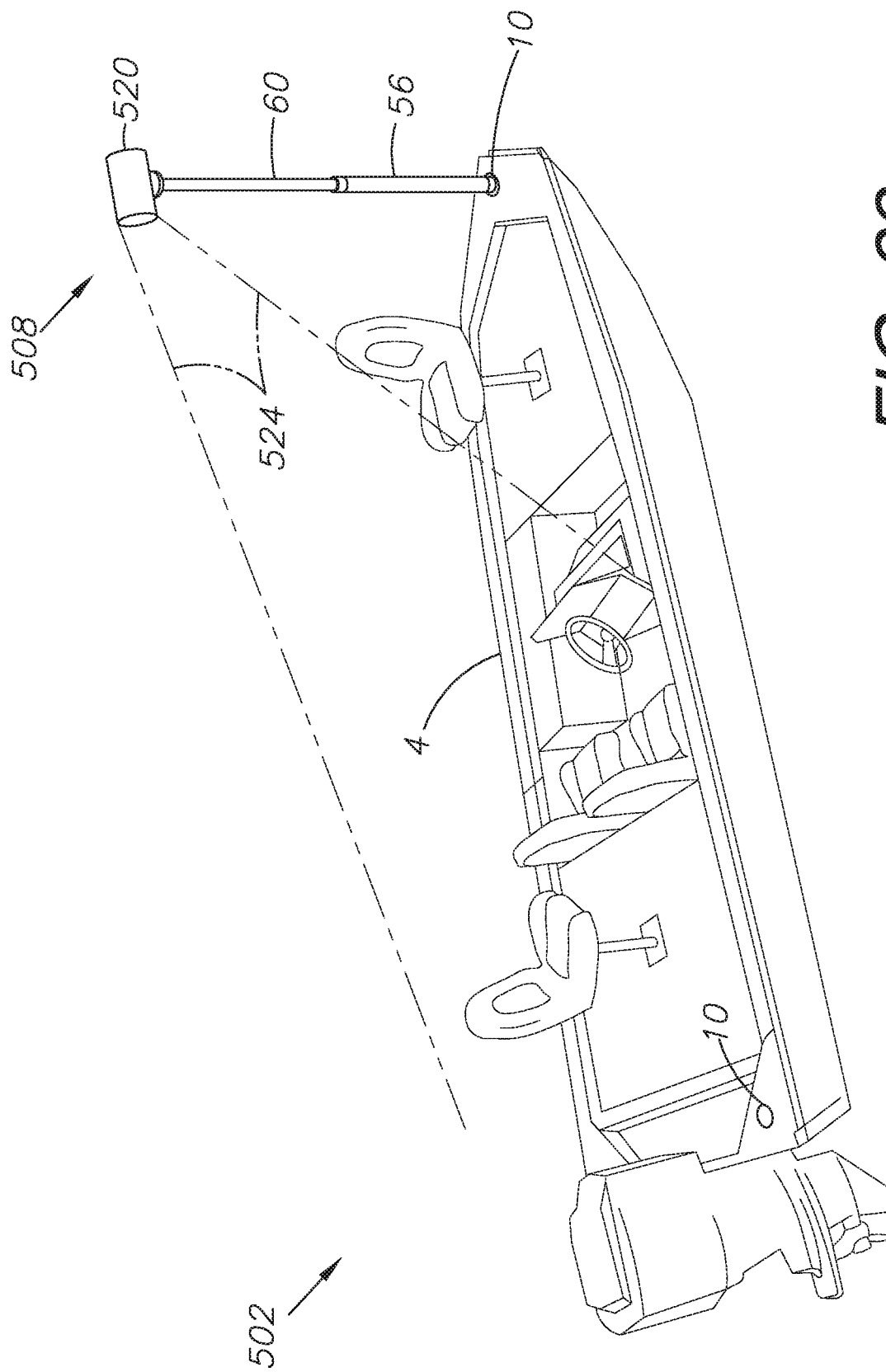
FIG. 22 is an isometric view thereof, showing the embodiment located in a typical environment in which it may be deployed, herein depicted as a bass fishing boat.

FIGS. 21 and 22 show yet another alternative embodiment of the present invention, featuring a telescoping monopod light source 502 which can be used with the embodiments discussed previously or in a stand-alone unit. As shown in FIGS. 21 and 22, the light source system 502 includes a light source accessory assembly 508 used in conjunction with the telescoping monopod of FIG. 5 discussed above.

The light source accessory assembly 508 includes a light source 520 and an adjustable mount 518 which may optionally be locked into a position or unlocked, allowing the light source 520 to be freely turned or pivoted to provide light 524 within a boat 4 or outside of the boat. This is advantageous for providing a spotlight into the boat while operating the boat at night, or for lighting up the waters around the boat. The light source 520 may be plugged into the power source socket 16 via a power cord 522, or may be powered by an internal battery. As shown in FIG. 22, the monopod may provide power to the light source accessory via the navigation light port 10 of the boat 4.

X. Alternative Monopod Light Source System 552

Figure 23:
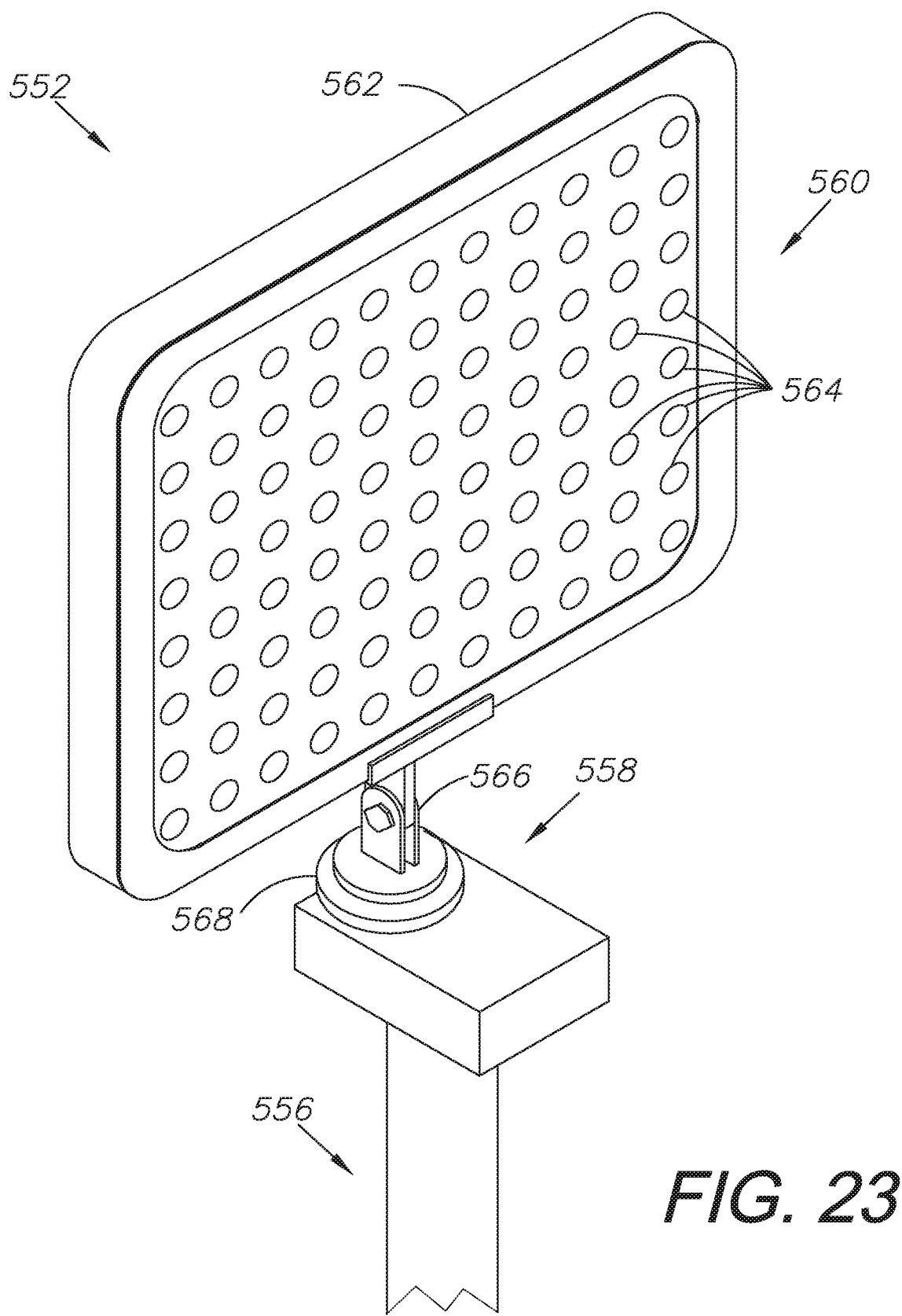
FIG. 23 is a three-dimensional isometric view of another alternative embodiment of the present invention including a light-emitting diode light panel.
Figure 24:
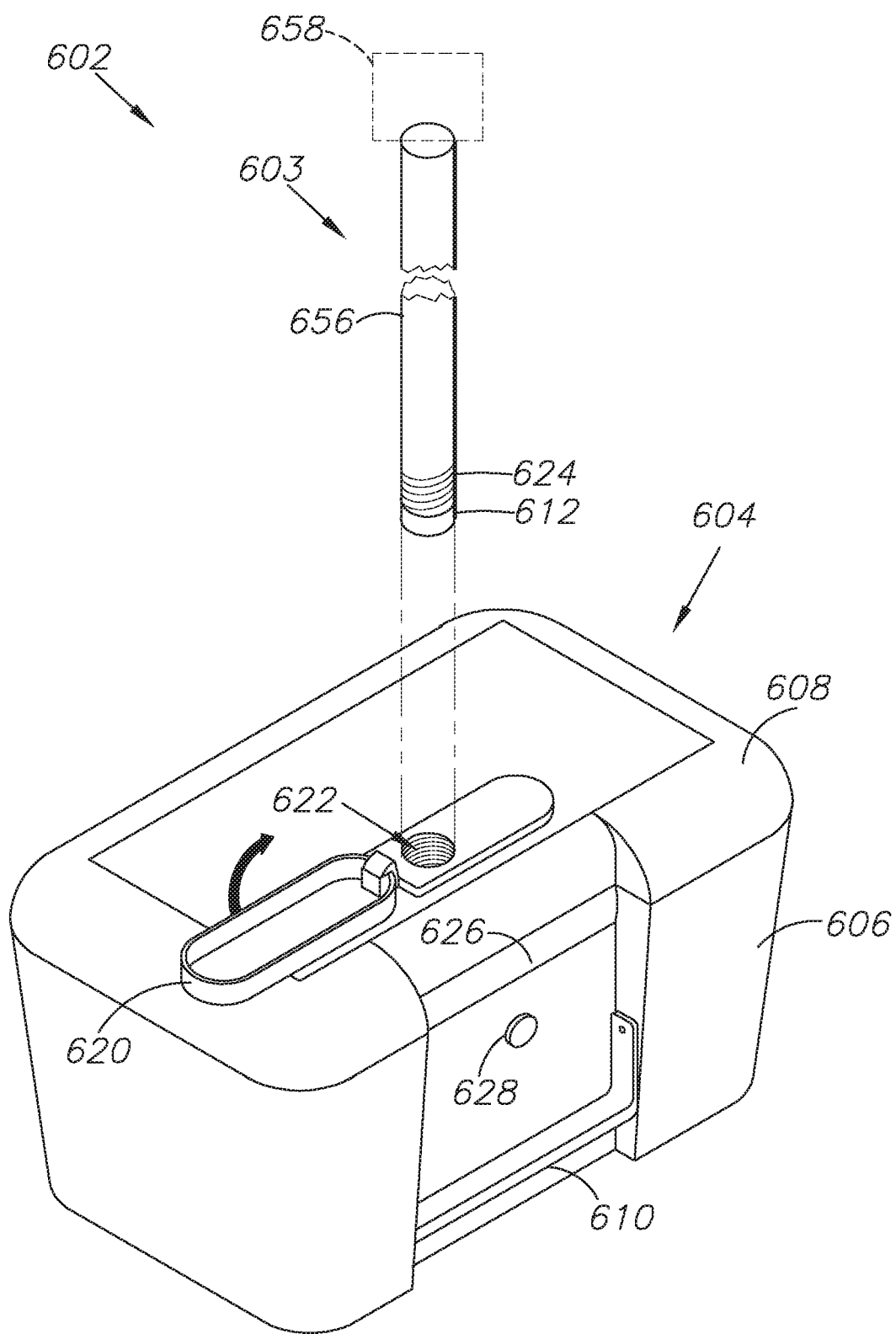
FIG. 24 is a three-dimensional isometric view of another alternative embodiment of the present invention showing a monopod in conjunction with a portable power box.
Figure 25:
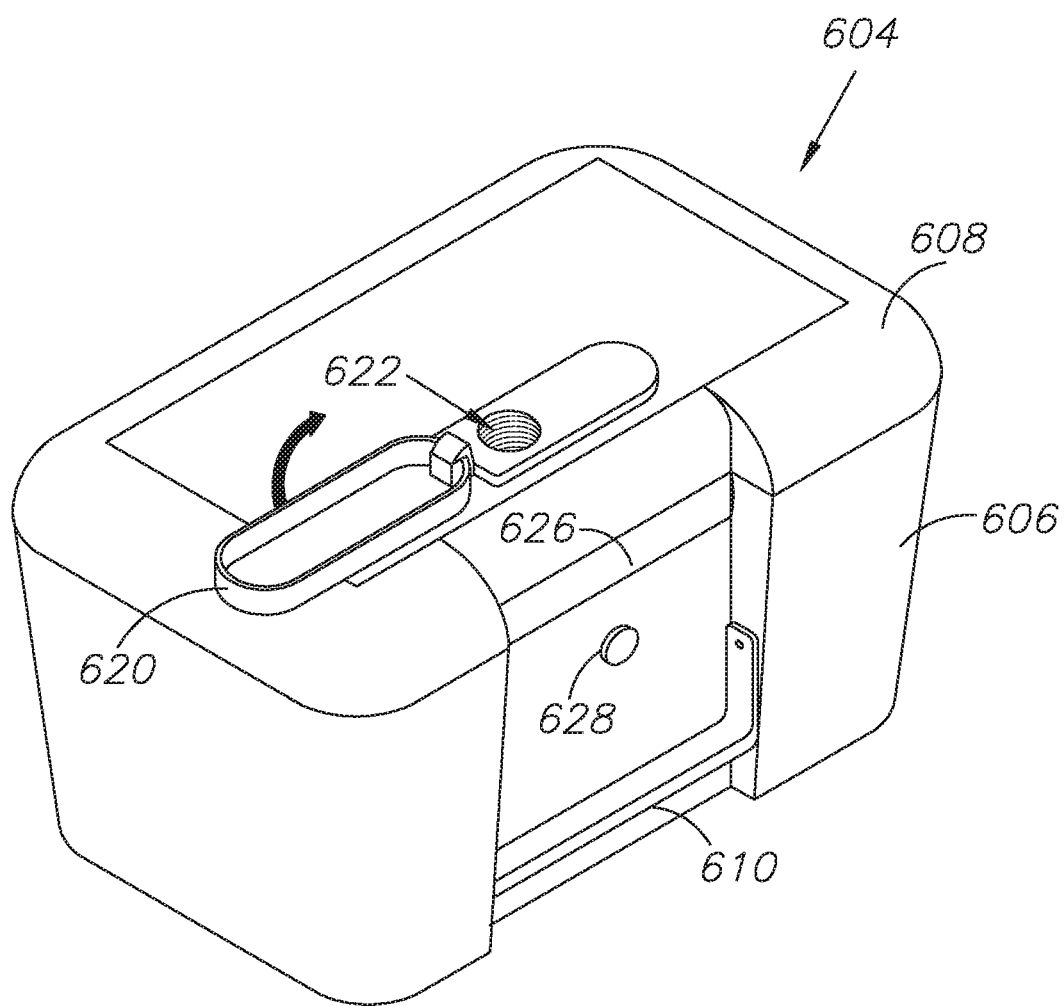
FIG. 25 is a three-dimensional isometric view of the portable power box thereof.

As shown in FIG. 23, a slightly alternative monopod light source system 552 employs a flat paneled light source 560 which includes a housing 562 and two faces. One or both faces could include one or more LEDs 564, which can be used to simply provide directional light or could be used to create an LED sign or signal for other boats in the vicinity by lighting up only some of the LEDs.

The housing 562 may be mounted on an accessory mount 558 which includes a pivotable bracket 566 which connected to a rotatable base element 568, allowing the light 560 to pivot up and down and to rotate for a directional light source. The entire mount 558 and light 560 is mounted to a monopod 556, such as those described above. The monopod 556 may be connected to the navigation light port 10 of a boat 4 or into a seat mount 410 within the deck of the boat 4. The light may be controlled by controls located directly on the light 560, such as on the housing 562, or it may be controlled remotely using a portable computing device such as a smartphone.

XI. Monopod Accessory Mount System 602 with Portable Power Box 604

FIGS. 24-32 show an alternative embodiment monopod accessory mount system 602 with a portable power box 604. The portable power box 604 allows a monopod 603 to be connected to it, allowing the monopod 603 to provide power to an accessory 658. The monopod 603 could be any of the monopods disclosed above, and the accessory 658 could be any of the accessories previously discussed.

Figure 26:
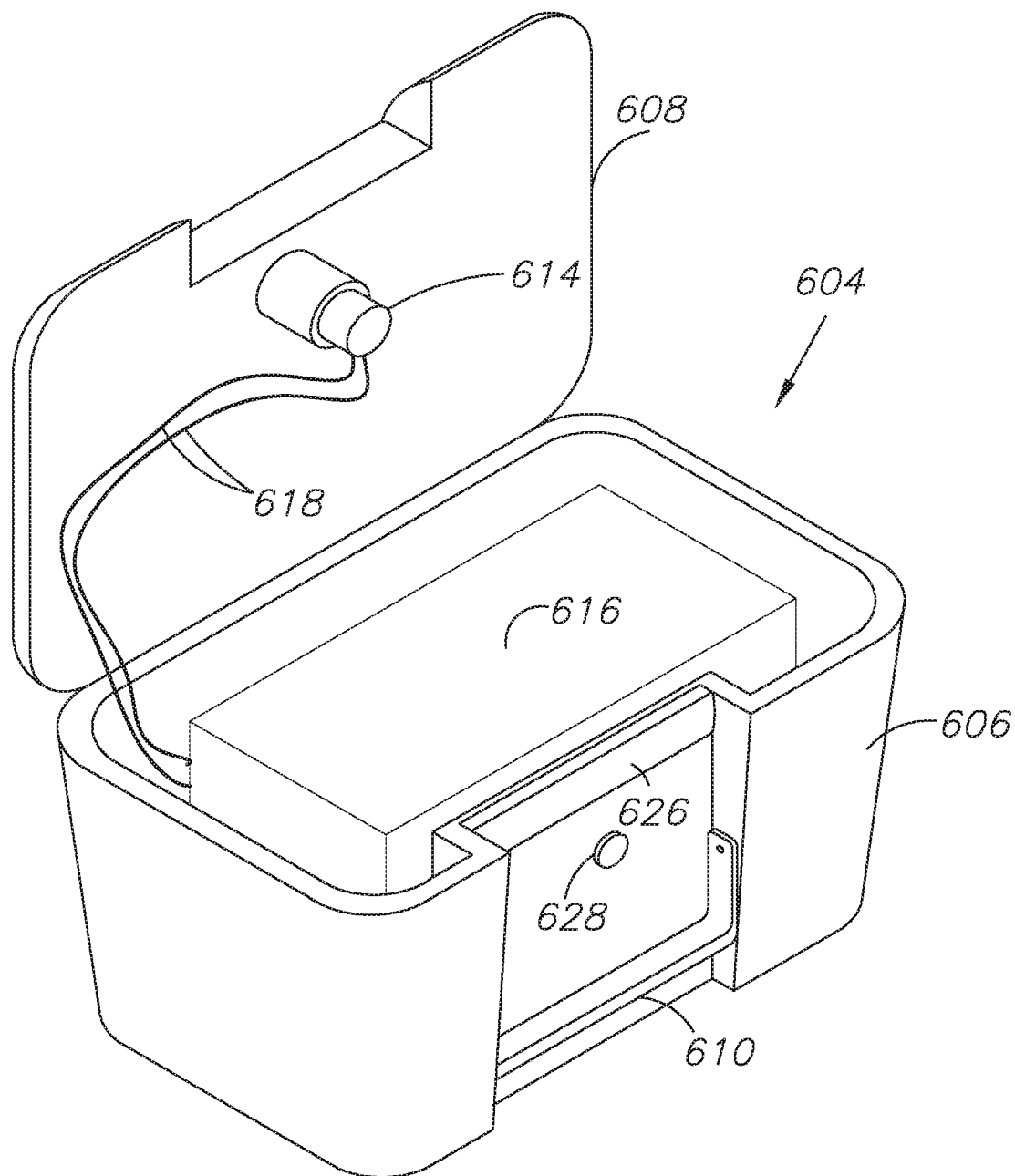
FIG. 26 is a three-dimensional isometric view of the portable power box thereof shown in an open configuration.
Figure 27:
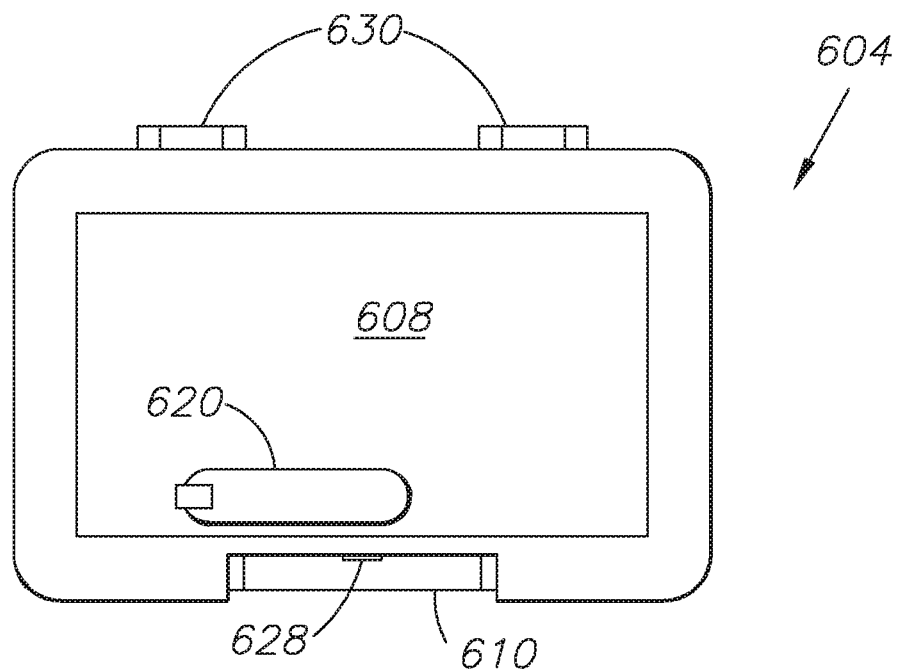
FIG. 27 is a top plan view thereof.
Figure 28:
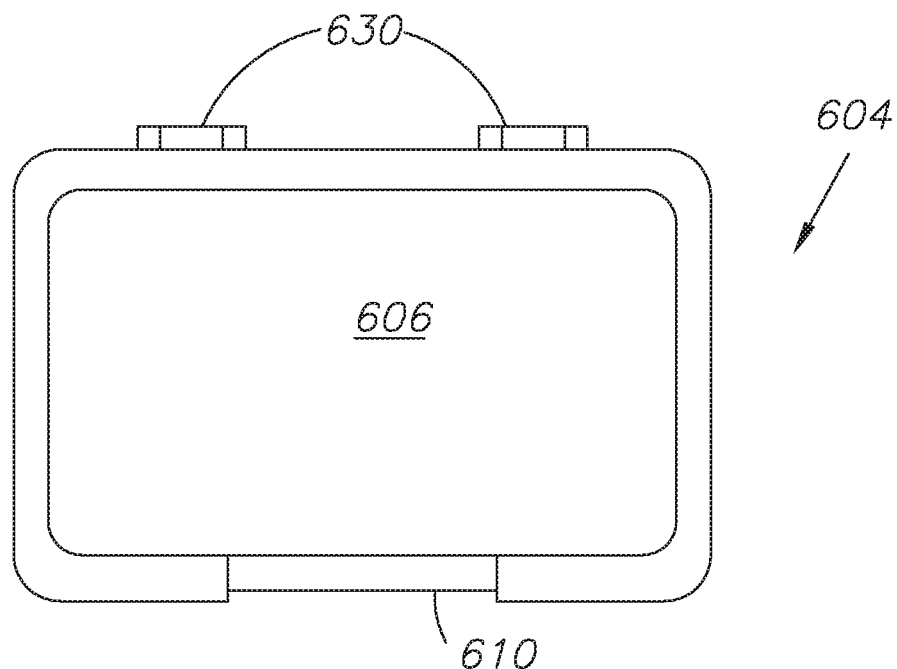
FIG. 28 is a bottom plan view thereof.
Figure 29:
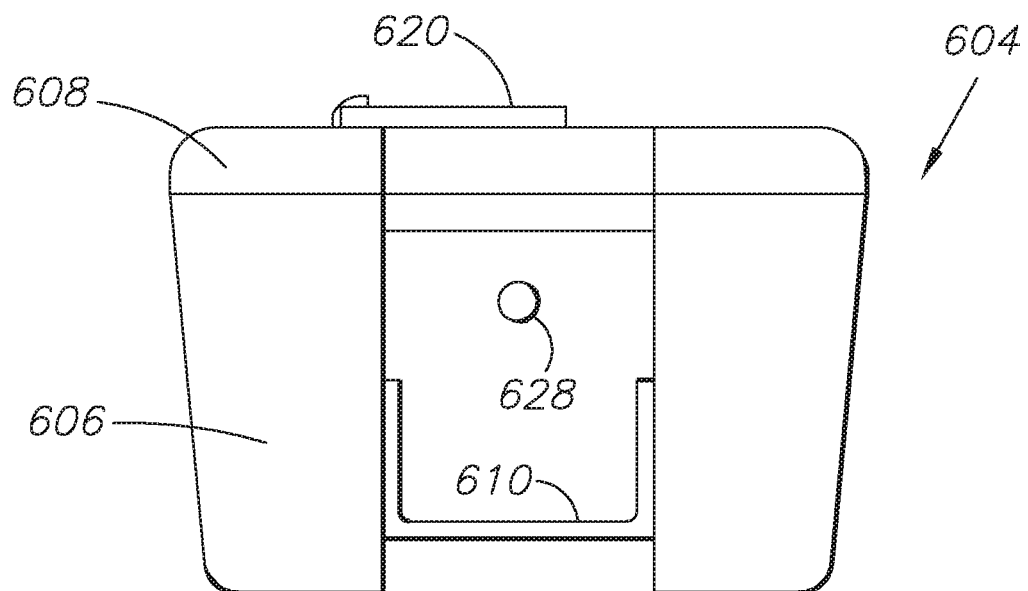
FIG. 29 is a front elevational view thereof.
Figure 30:
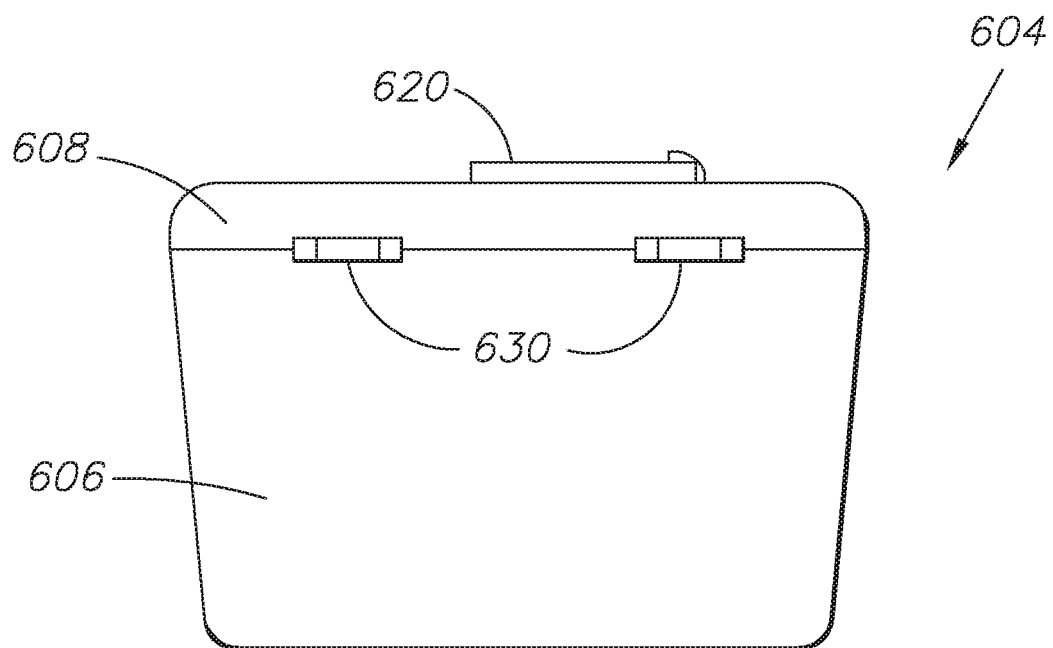
FIG. 30 is a rear elevational view thereof.
Figure 31:
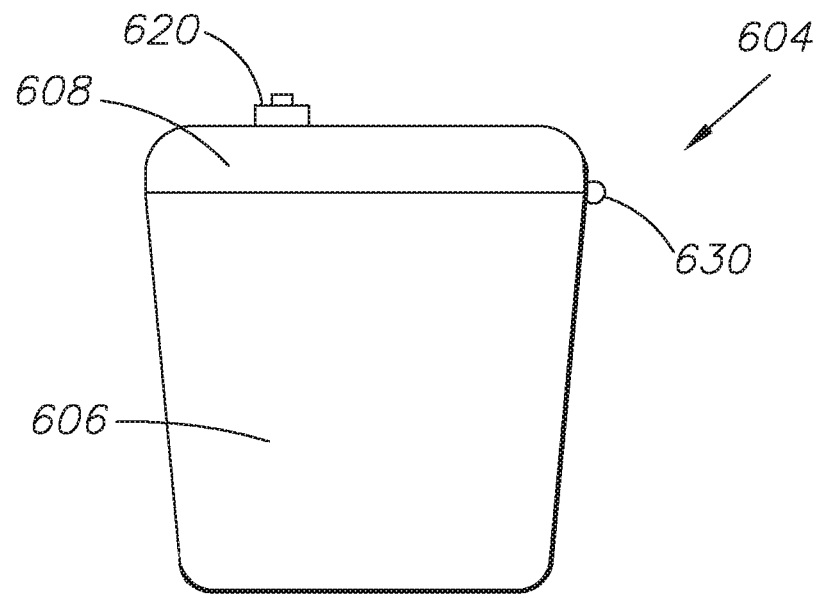
FIG. 31 is a right side elevational view thereof.
Figure 32:
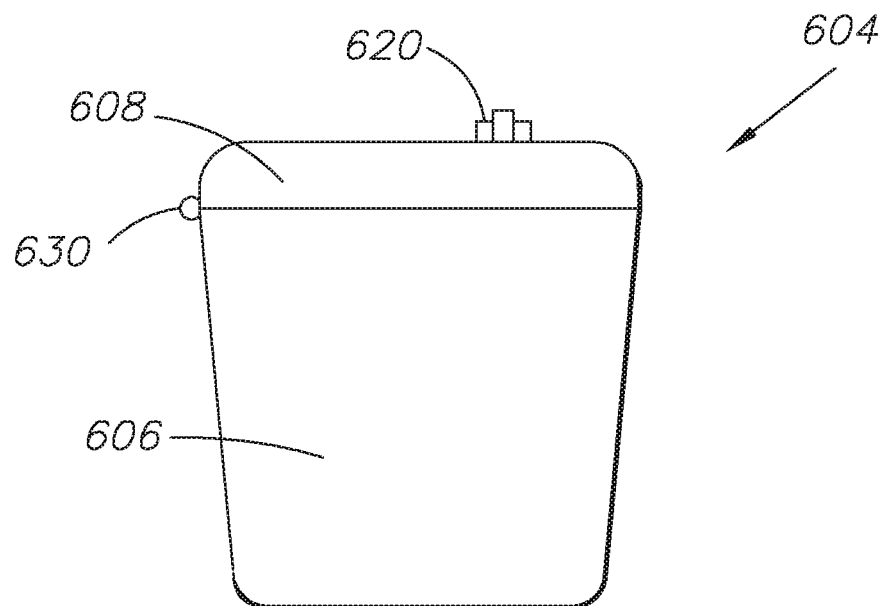
FIG. 32 is a left side elevational view thereof.
Figure 33:
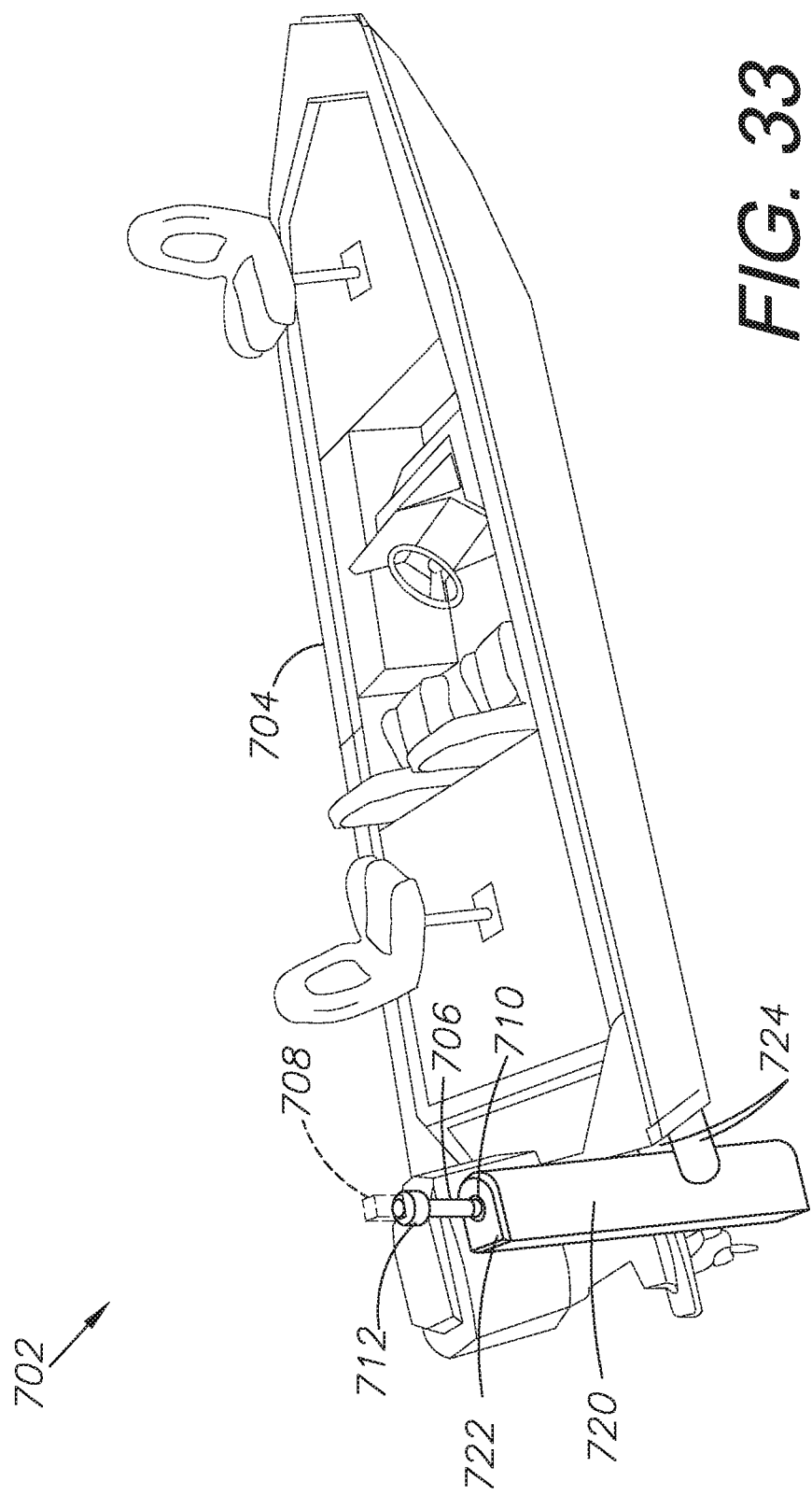
FIG. 33 is a three-dimensional isometric view of another alternative embodiment of the present invention shown in relation to a preferred environment of a boat.
Figure 35:
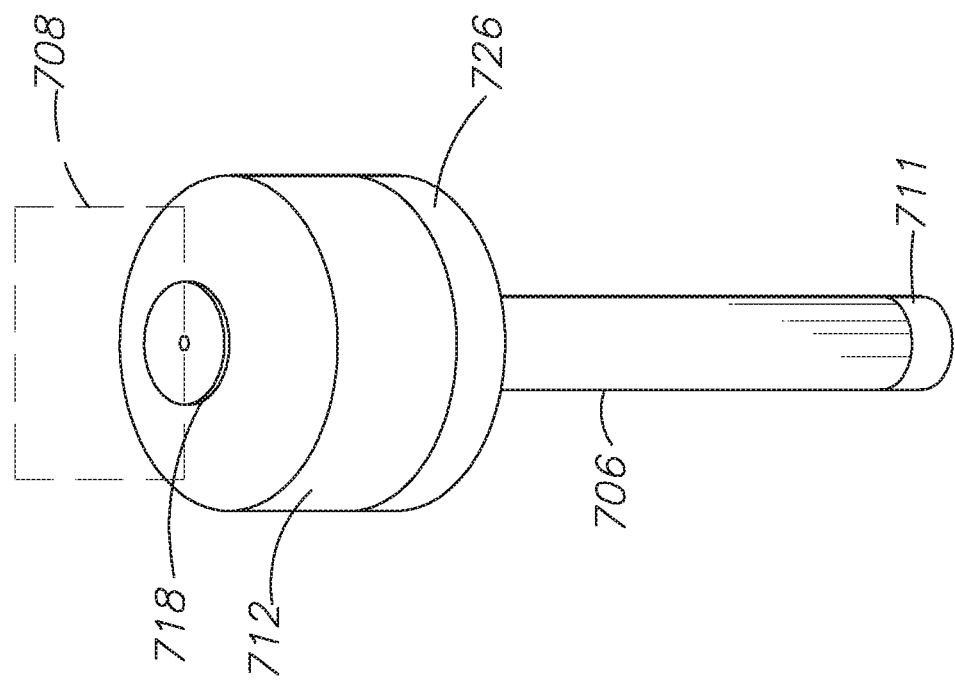
FIG. 35 is a top-down three-dimensional view thereof.
Figure 34:
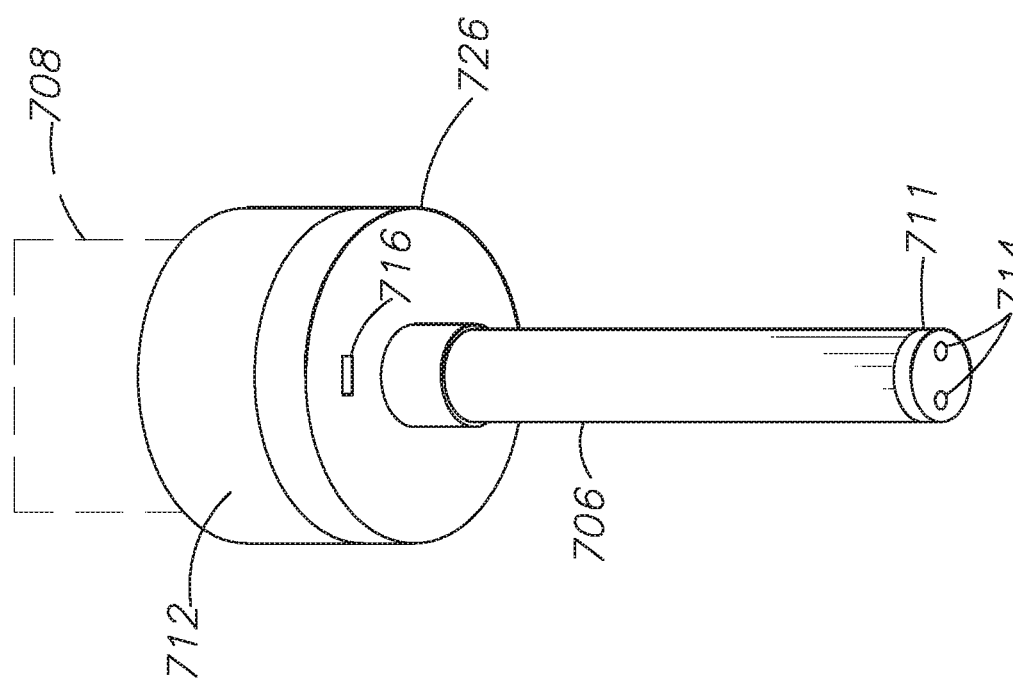
FIG. 34 is a bottom-up three-dimensional view thereof.
Figure 36:
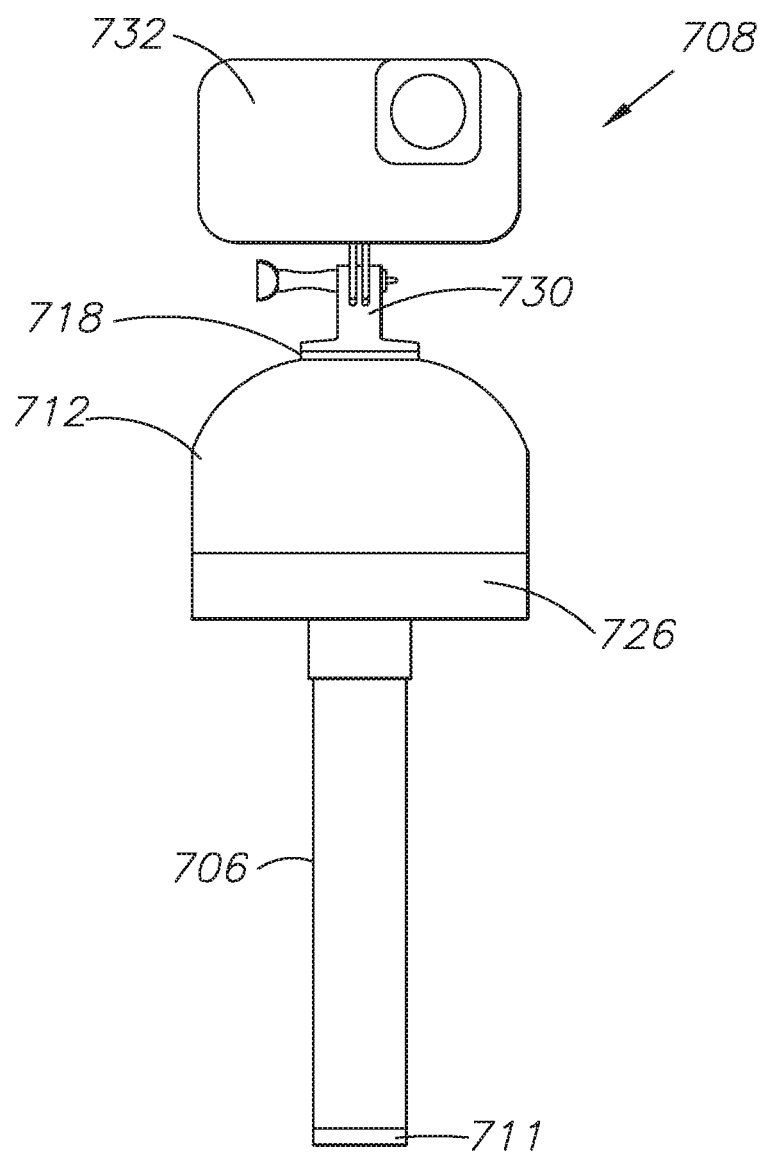
FIG. 36 is a side elevational view thereof shown using a camera mount.
Figure 37:
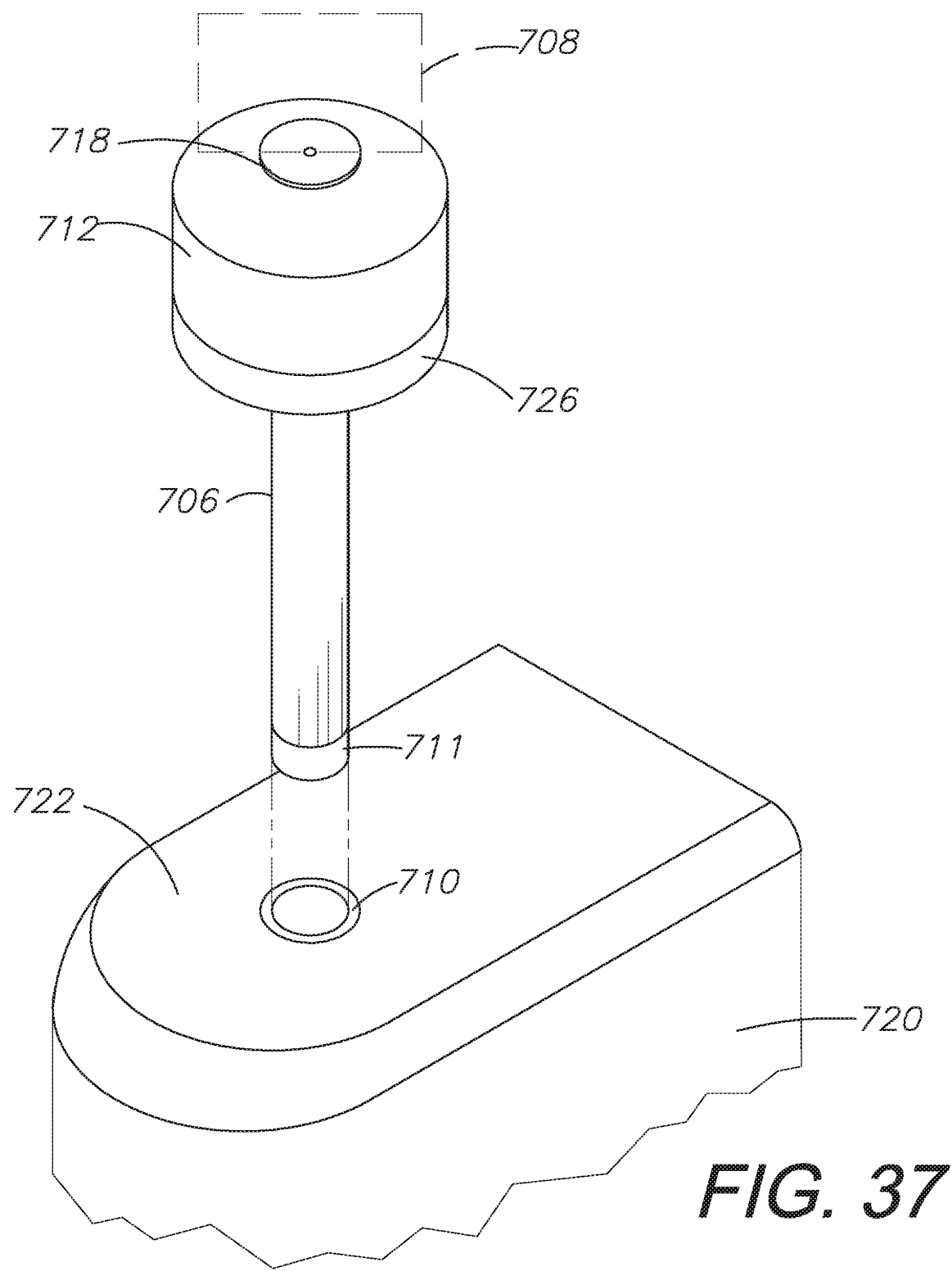
FIG. 37 is a three-dimensional isometric view thereof shown interacting with an anchor cap element.

The power box 604 includes a top portion 608 and bottom portion 606 connected by hinges 630 which allows the box to be opened, such as shown in FIG. 26. A battery 616 is stored within the bottom portion 606 of the box 604. The top portion 608 includes a receiver port 622 for receiving the base 612 of the monopod 603, which as discussed previously allows power to be transferred up through the shaft 656 of the monopod to the accessory 658. The receiver port 622 may be threaded to receive threads 624 of the monopod shaft 656 to secure the monopod 603 to the box 604. A cap 620 can seal the receiver port 622 when not in use.

The portable power box 604 may include a light 626 and switch 628 for activating the light for positional lighting in a dark location. The box 604 may also include a handle 610 for carrying the box.

FIG. 26 shows how the internal portion 614 of the receiver port 622 which connects wiring 618 to the battery 616 to transfer power from the battery to the receiver port and then into the base 612 of the monopod. As discussed above, the base 612 is configured for connection to a typical marine navigational light port, which the receiver port 622 functions similarly to.

The box 604 is weighted to support the monopod 603 such that it prevents tipping, allowing the monopod 603 to be placed in a location. The accessory 658 may include a light for lighting up an area, a camera, or some other electrical accessory requiring power from the battery 616.

XII. Anchor Cap Monopod System 702

As shown in the FIGS. 33-37, the present invention is an anchor cap monopod system 702 for affixing a monopod 706 to an anchor mount cap 722 for a boat anchor 720 such as the Talon anchor manufactured by Johnson Outdoors, Inc. of Racine, Wis. The monopod 706 includes a light source 712 and accessory mount 718 for connecting an electrical accessory 708 such as a camera mount 730 for mounting a camera 732, such as a GoPro® cameras manufactured by GoPro, Inc. of San Mateo, Calif. The monopod 706 includes a power connection 716, such as a USB port, for powering and charging electrical accessories such as cellular phones or the camera or other accessory mounted to the camera mount.

The anchor mount cap 722 includes a power port 710 for receiving the monopod 706. The anchor mount cap would be either connected to power of the anchor 720 or would include a battery for powering the power port 710.

The monopod 706 has a base 711 with contacts 714 for drawing power from the power port 710. The monopod light 712 is connected to a light base 726 which includes the power connection 716.

The accessory mount 708 could also mount flood lights or other accessories, which may be self-powered or may be powered using the power port 716.

XIII. Motor Cap Monopod System 752

Figure 38:
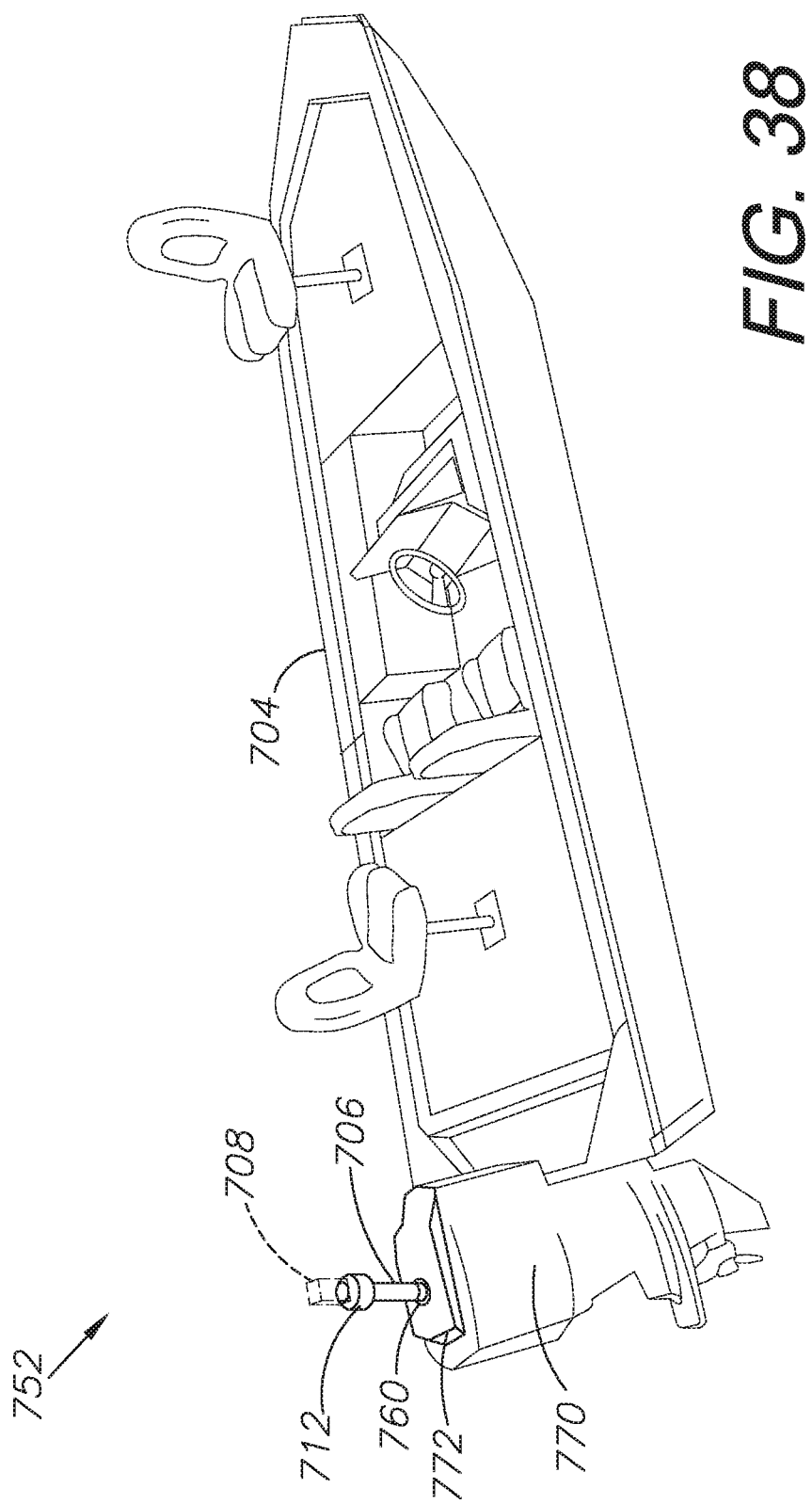
FIG. 38 is a three-dimensional isometric view of another alternative embodiment of the present invention shown in relation to a preferred environment of a boat.
Figure 39:
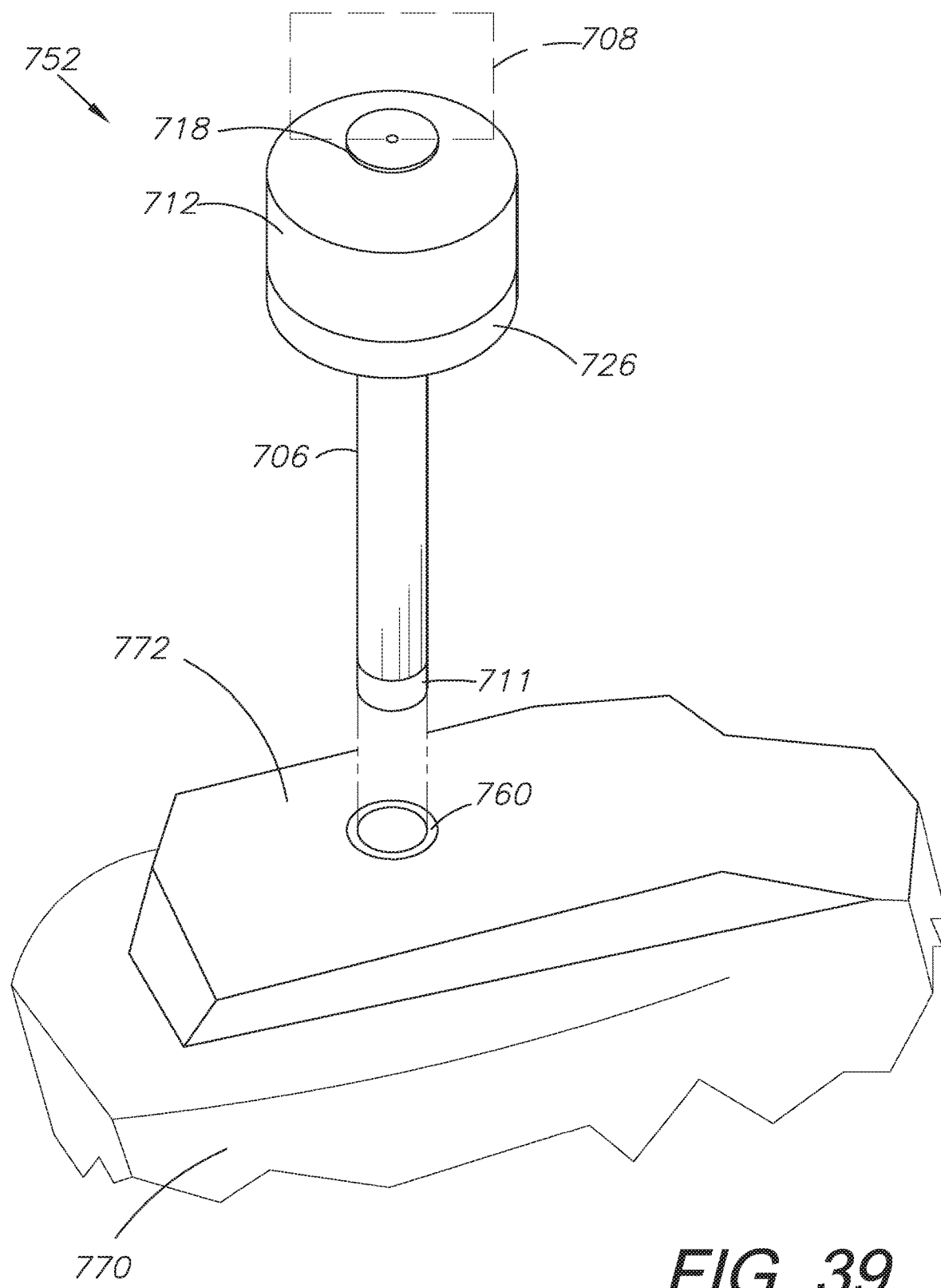
FIG. 39 is a three-dimensional isometric view thereof shown interacting with a motor cap element.

FIGS. 38 and 39 show a slightly alternative embodiment motor cap monopod system 752 using the same monopod 706 of the previous embodiment, but instead providing a power port 760 within a motor cap 772 which can be placed atop a standard boat motor 770.

As before, the monopod 706 includes a light source 712 and accessory mount 718 for connecting an electrical accessory 708. The monopod 706 has a base 711 with contacts 714 for drawing power from the power port 710. The monopod light 712 is connected to a light base 726 which includes the power connection 716.

The accessory mount 708 could also mount flood lights or other accessories, which may be self-powered or may be powered using the power port 716.\

XIV. Kayak Power Port and Rail System 802

Figure 40:
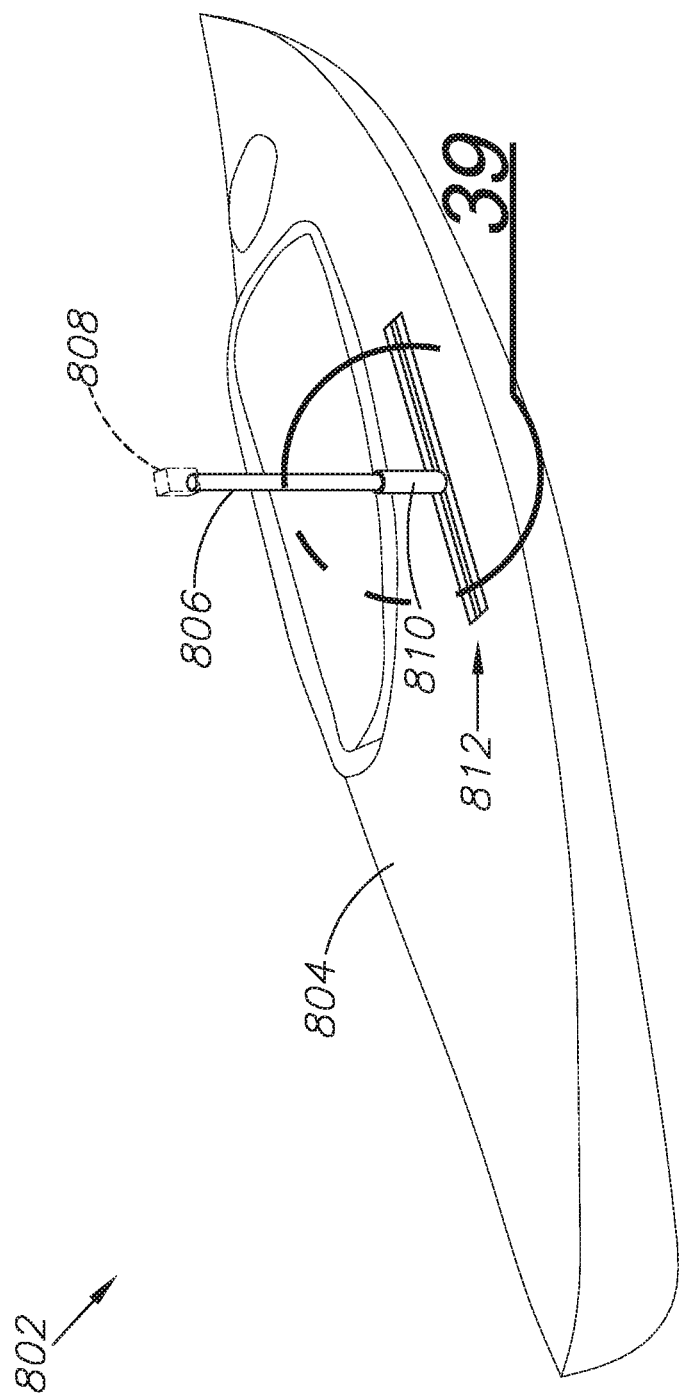
FIG. 40 is a three-dimensional isometric view of another alternative embodiment of the present invention shown in relation to a preferred environment of a kayak.

FIG. 40 shows a kayak power port and rail system 802 where a kayak 804 is fitted with a mounting rail 812. A power port device 810 is affixed to the rail, and a monopod 806 is deployed within a power port of the power port device. An accessory 808 can be mounted to the top of the monopod and powered through power provided by the power port device 810.

Figure 41:
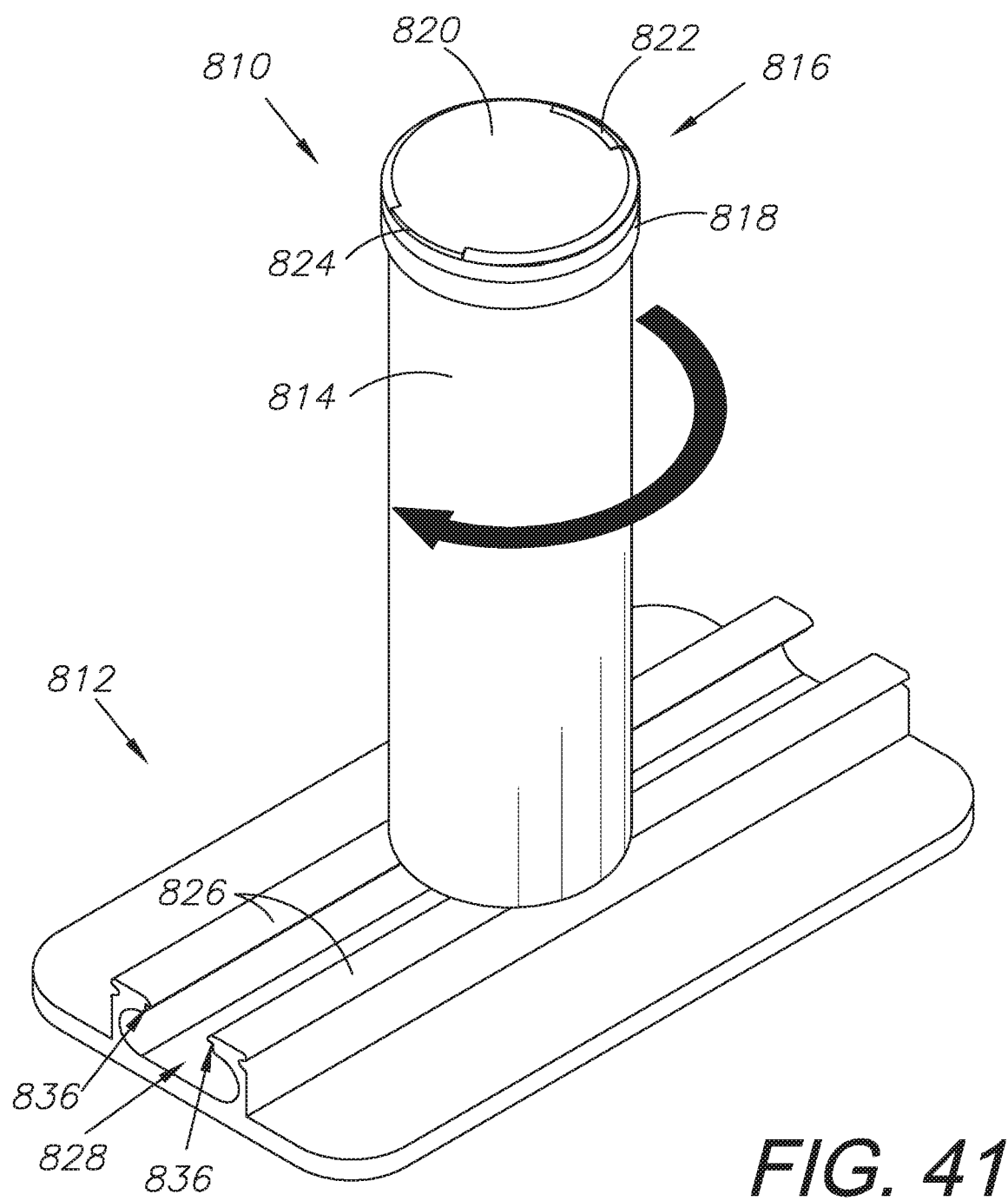
FIG. 41 is a three-dimensional top-down isometric view of the power port and rail elements thereof as taken about the circle of FIG. 38.
Figure 42:
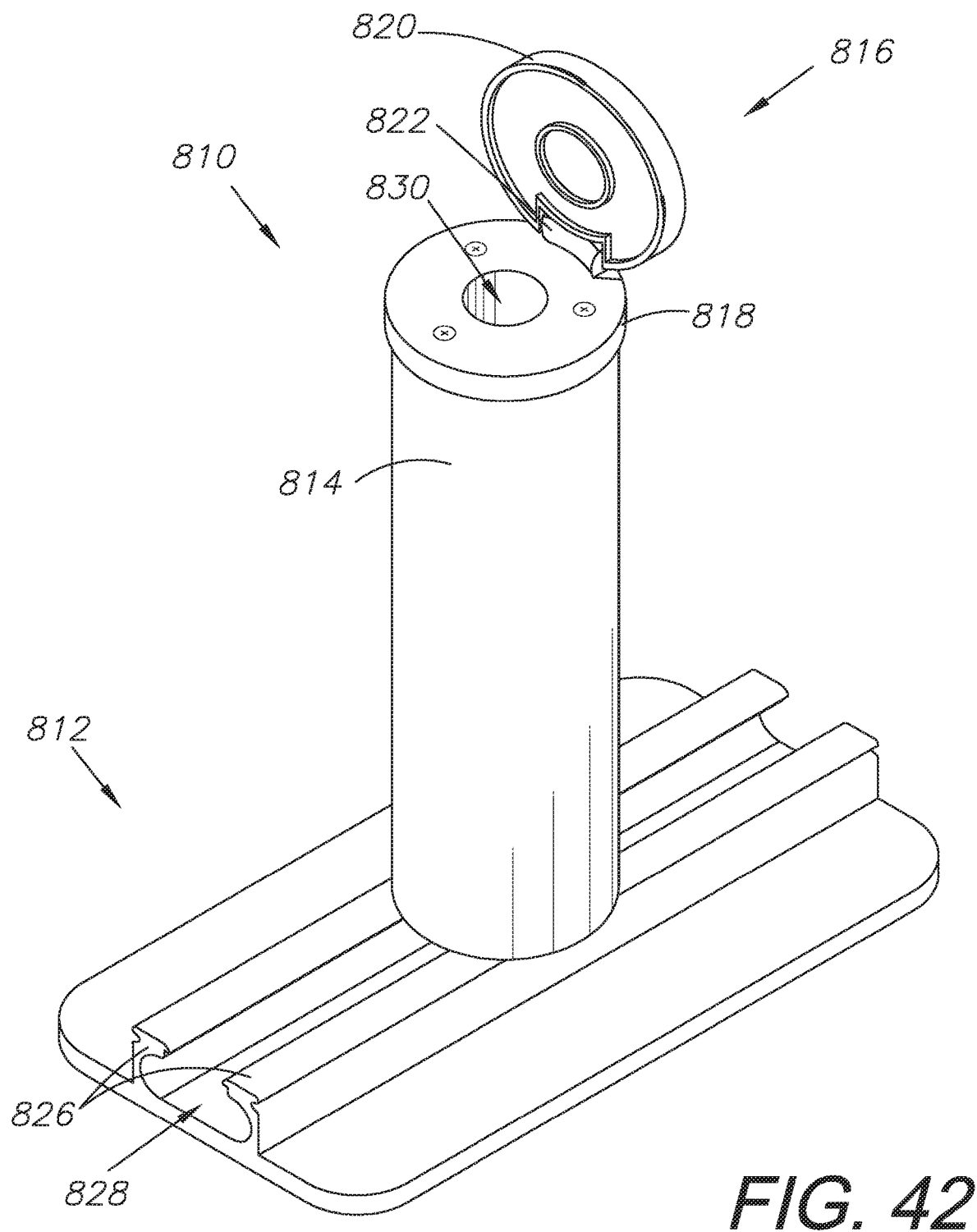
FIG. 42 is a three-dimensional top-down isometric view thereof shown in an open orientation.
Figure 44:
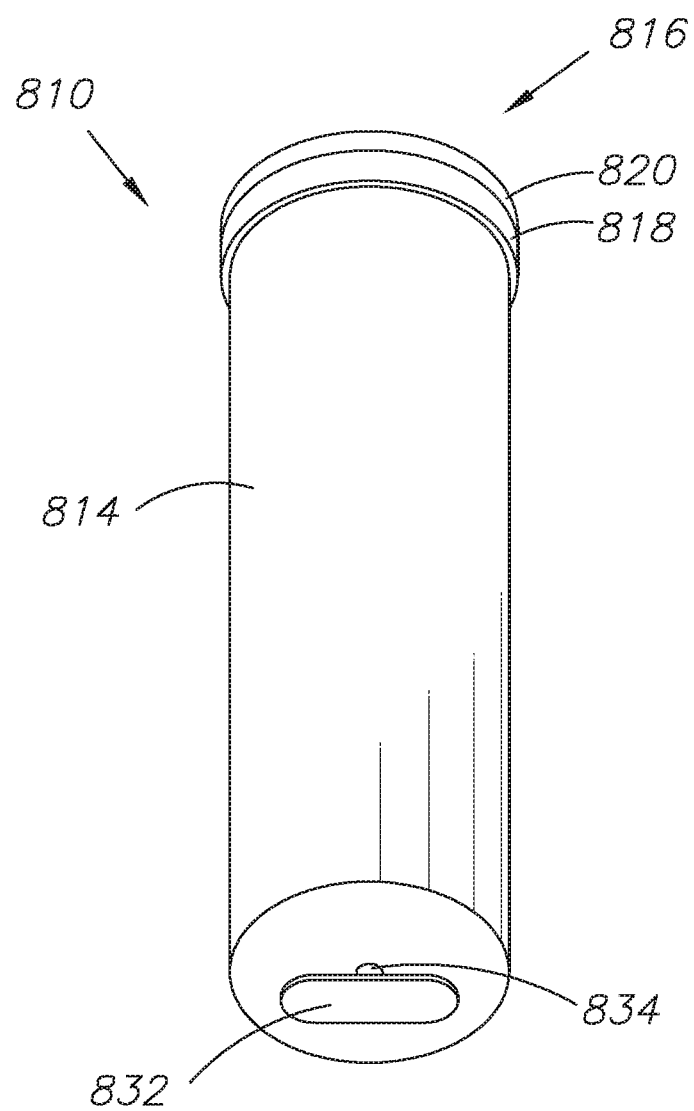
FIG. 44 is a three-dimensional bottom-up isometric view of the power port element thereof.

FIG. 41 shows the power port device 810 in conjunction with the rail 812. The power port device 810 has a main housing 814 and a power port 816 which is inserted into and connected to the housing 814, using screws or other attachment devices as shown in FIG. 42. The power port 816 has a main body 818 and a lid 820 which are connected via a hinge 822. A lip 824 can be included to help facilitate the opening of the lid 820. The rail 812 is made of a pair of guides 826 which form a slot 828. A threaded connector 832 as shown in FIG. 44 can be slotted into the slot 828 and tightened against the guides 826 using the threaded connection 834 of the threaded connector 832. This presses the threaded connector 832 against the shoulders 836 of the guides 826.

Figure 43:
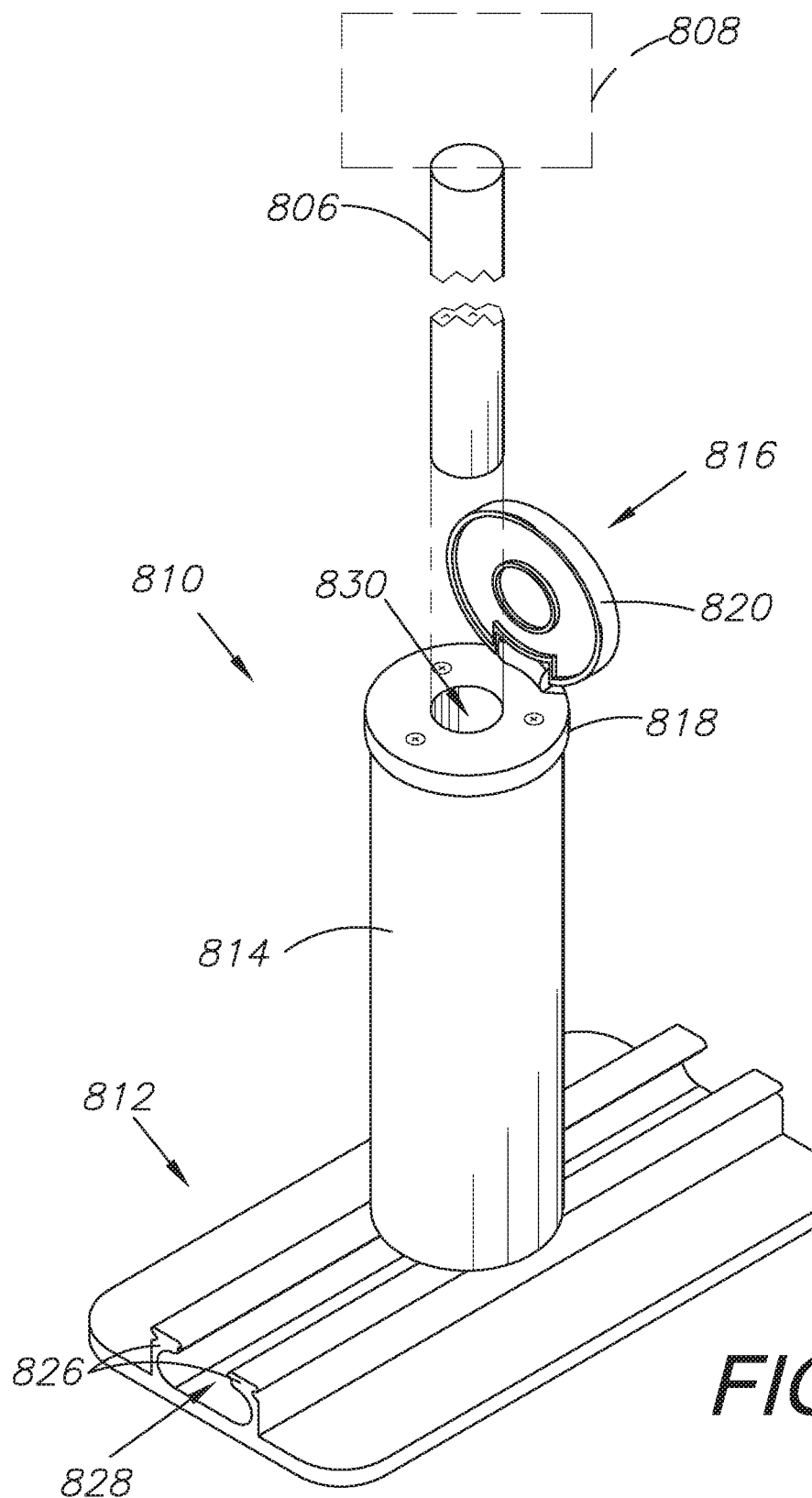
FIG. 43 is a three-dimensional top-down isometric view thereof shown in conjunction with a monopod and accessory element.

When the lid 820 is opened as shown in FIG. 42, access to the monopod receiver 830 is provided. As shown in FIG. 44, the monopod 806 is inserted into the monopod receiver 830, which includes power pins for providing power to the monopod 806. The accessory 808, which can be any accessory discussed in the previous embodiments, is powered using the monopod 806, which may include any of the monopod devices discussed in the previous embodiments or any other monopod capable of providing power to the accessory. FIG. 43 shows the connecting of a monopod 806 to the power port device 810.

Figure 45:
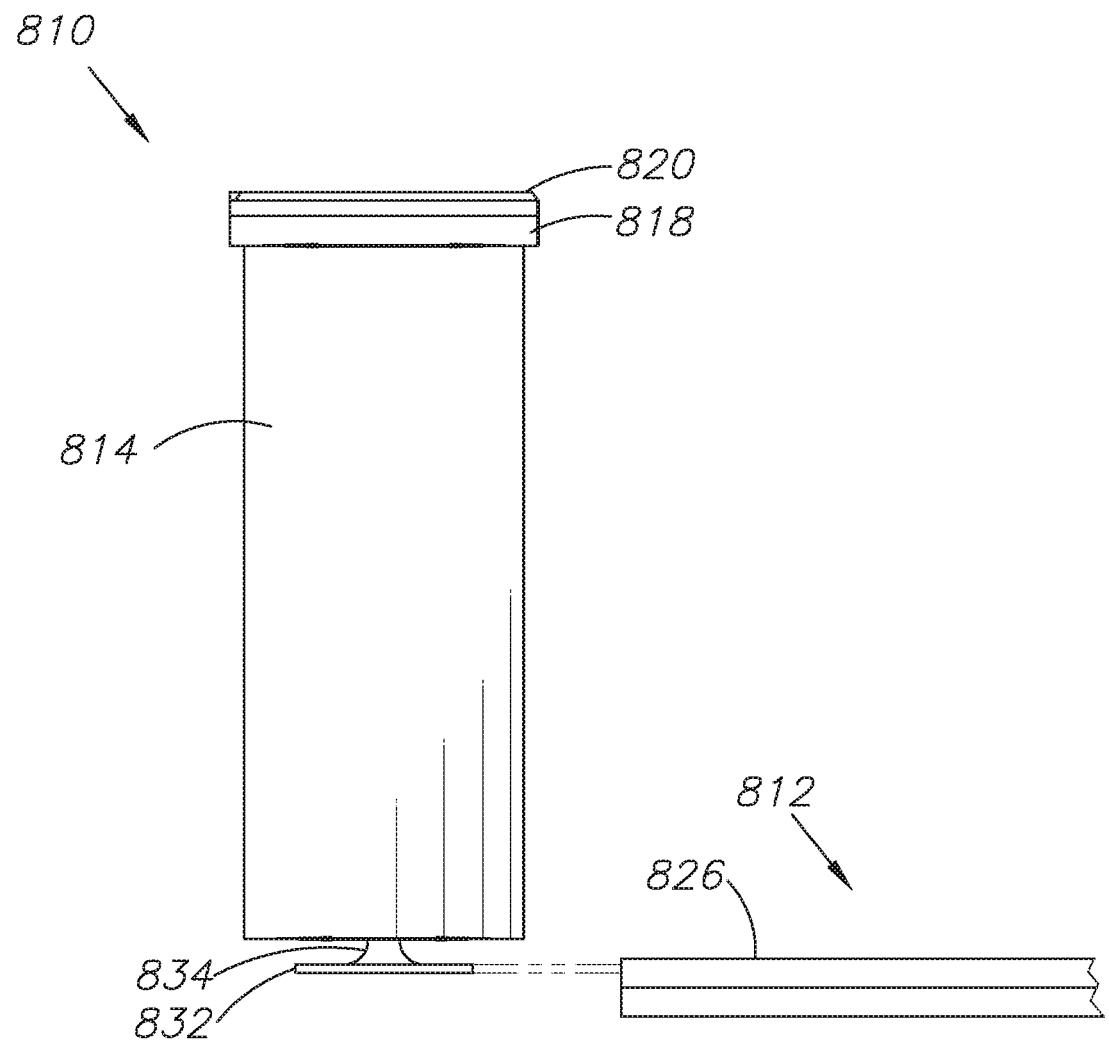
FIG. 45 is a side elevational view thereof.
Figure 46:
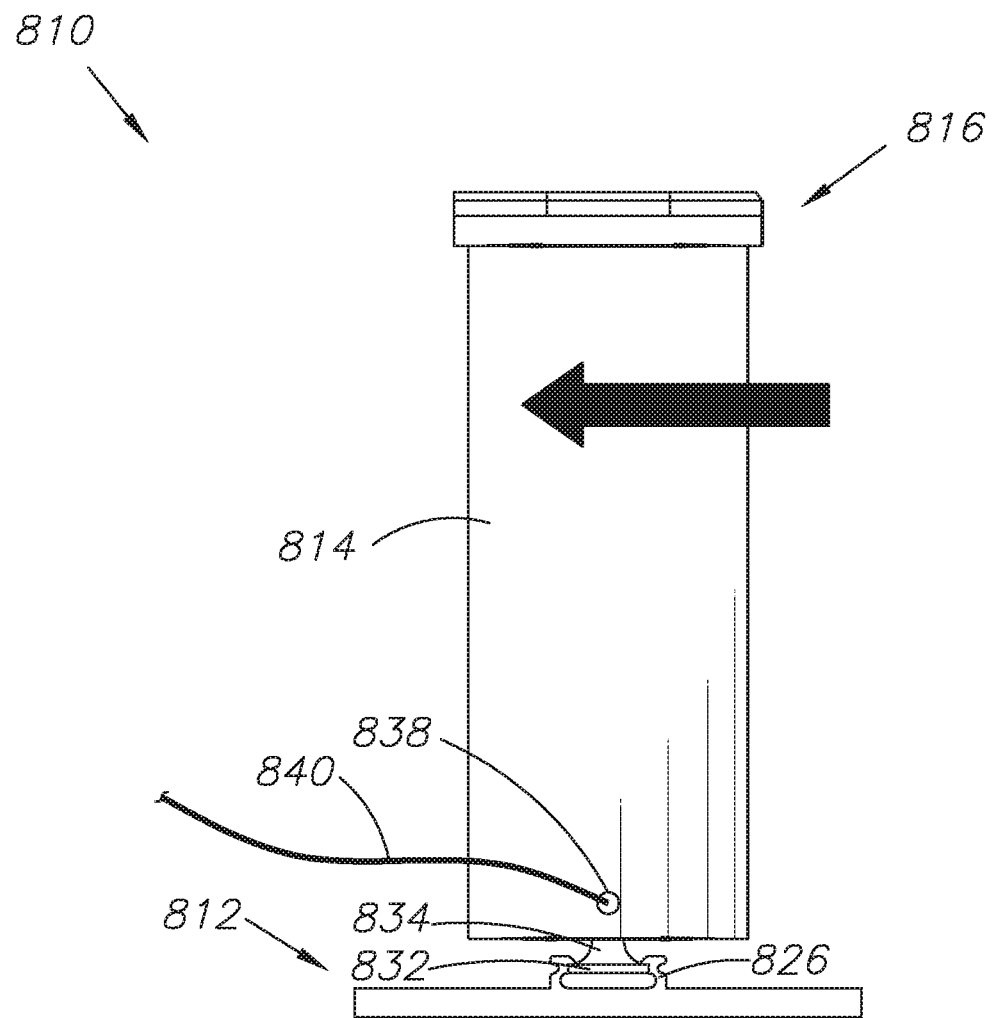
FIG. 46 is a front elevational view thereof.

FIGS. 45 and 46 show how the threaded connector 832 is inserted into the slot 828 between the guides 826 of the rail 812 and can be tightened by turning the housing 814 clockwise, threading the connection 834 of the threaded connector 832 into a threaded port on the bottom of the housing 814. Turning the housing counterclockwise loosens the connection 834 of the connector 832, allowing the power port device 810 to be removed from the rail 812.

A power cable 840 is connected to a power supply, such as a battery, located in the kayak or near the kayak. The power cable 840 passes through a cable port 838 within the housing 814 of the power port device 810 and provides electrical power to the power port 816.

Figure 47:
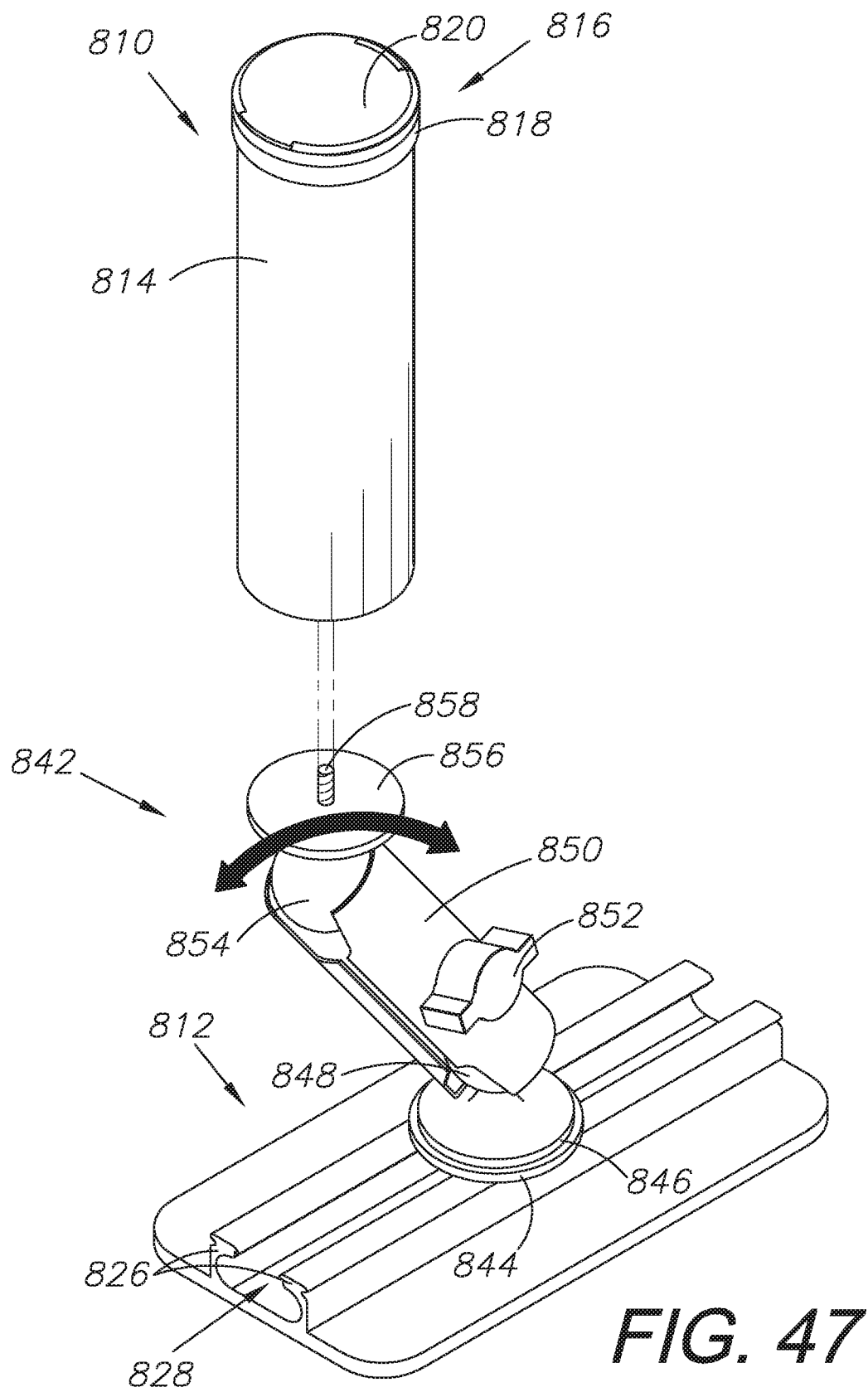
FIG. 47 is a three-dimensional isometric view of the embodiment of FIG. 39 shown with an adjustable mount element.
Figure 48:
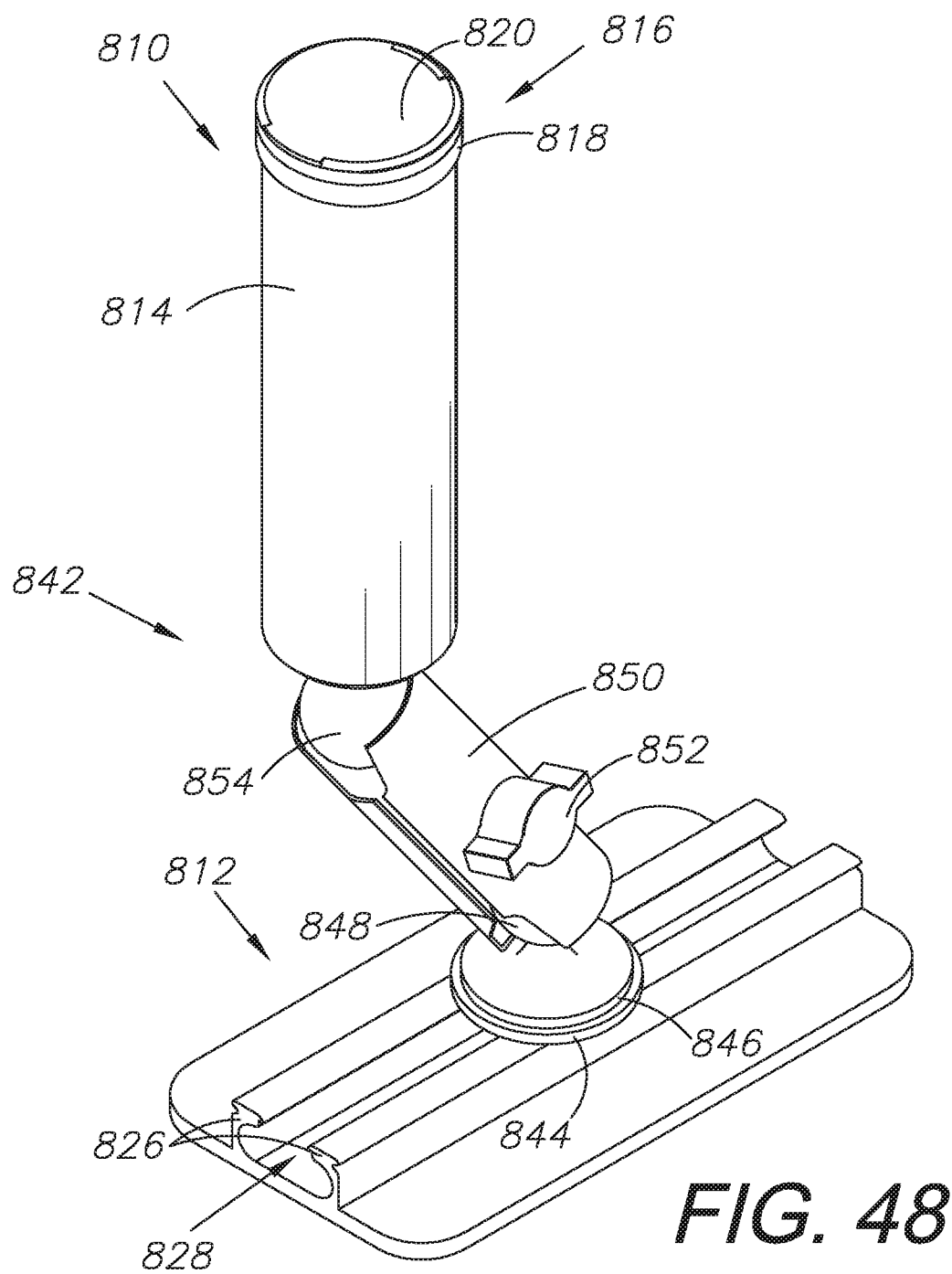
FIG. 48 is a three-dimensional isometric view thereof shown assembled.
Figure 49:
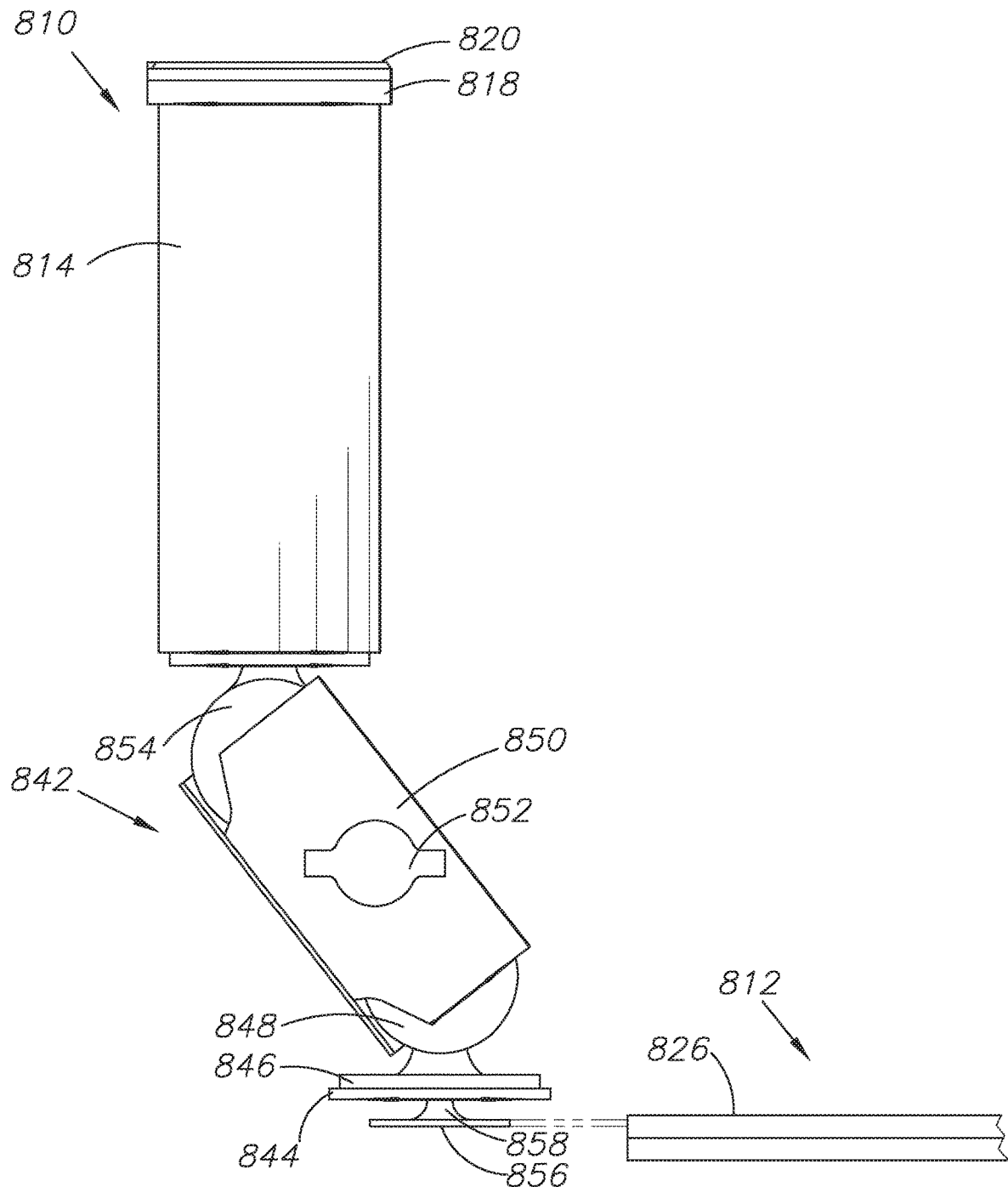
FIG. 49 is a side elevational view thereof.

FIGS. 47-49 show the power port device 810 connected to the rail 812 using an adjustable mount 842. This adjustable mount could be like that disclosed in U.S. Pat. No. 5,845,885 to Carnevali and assigned to National Products, Inc. of Seattle, Wash. which is incorporated herein by reference. An embodiment of the adjustable mount 842 as shown includes a base 844 which connects to the rail 812, a first connector 846 with a first ball joint 848 connected to one end of the adjustable mount 842 housing 850. A second connector 856 is connected to the other end of the housing 850 by a second ball joint 854. An adjustment knob 852 can loosen the housing 850 to allow adjustment of the angles of the connectors 846, 856 via the ball joints 848, 854. A spring or threaded element inside of the housing 850 may be used to adjust the housing about the ball joints. A threaded connector 858 on the second connector 856 can receive the threaded port on the bottom of the power port device housing 814. This allows the power port device 810 to be mounted at any desired angle from the rail 812. The base 844 includes a threaded connector 856 with a connection 858 identical to the threaded connector 832 with connection 834 of the power port device 810 discussed above. It can be received within the slot 828 defined by the guides 826 of the rail 812.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A monopod system comprising:
   the monopod including a cylindrical elongated body portion having a proximal end and a distal end, a base portion located in proximity to the proximal end of said elongated body, and a tip portion located in proximity to the distal end of said elongated body;
   a cap comprising a housing having a top face, said housing connected to a power source for providing power;
   said base portion of said monopod engaged with and affixed to said cap top face;
   said cap configured for placement atop a piece of equipment connected to a marine vessel;
   wherein said monopod is configured to interface with a portable accessory;
   said tip portion comprising at least one power connection, said power connection capable of providing electrical power to said portable accessory; and
   said tip portion further comprising an accessory mount configured for receiving and connecting said portable accessory.

2. The system of claim 1, wherein said power connection comprises a universal serial bus (USB) port.

3. The system of claim 1, further comprising, wherein said portable accessory comprises a camera.

4. The system of claim 1, wherein said portable accessory is one of the accessories chosen from the list comprising: a smart phone; a tablet computer; a digital camera; a geographical positioning system (GPS) unit; and a fish finder.

5. The system of claim 1, wherein said cap top face comprises a power port for receiving said base portion of said monopod, and wherein said power port is threaded for threadably retaining said base portion of said monopod.

6. The system of claim 1, wherein said tip further comprises a light.

7. The system of claim 1, wherein said piece of equipment comprises a shallow water anchor.

8. The system of claim 1, wherein said piece of equipment comprises a boat motor.

9. A marine equipment cap power system comprising:
   a housing having a top portion and a bottom portion;
   said bottom portion connected to a piece of equipment mounted to a marine vessel;

a power port within said top portion, said power port electrically connected to a power source;

said power port configured for interfacing with a monopod having a cylindrical elongated body portion having a proximal end and a distal end, a base portion located in proximity to the proximal end of said elongated body, said base portion configured to interface with a navigation light port of a marine vessel, and a tip portion located in proximity to the distal end of said elongated body;

wherein said monopod is configured to interface with a portable accessory; and wherein said battery is configured for transferring electrical power through said navigation light port to said monopod and to said portable accessory.

10. The system of claim 9, wherein said tip of said monopod includes a light.

11. The system of claim 9, wherein said power port is threaded for threadably retaining said base portion of said monopod.

12. The system of claim 9, further comprising:

said tip portion comprising at least one power port, said power port capable of providing electrical power to said portable accessory;

said power connection providing said electrical power for said power port; and said tip portion further comprising an accessory mount configured for receiving and connecting said portable accessory.

13. The system of claim 9, wherein said piece of equipment comprises a shallow water anchor.

14. The system of claim 9, wherein said piece of equipment comprises a boat motor.

15. A method of powering a portable electrical accessory, the method comprising the steps:

connecting a cap to a piece of equipment mounted to a marine vessel;

providing a monopod, said monopod having a cylindrical elongated body portion having a proximal end and a distal end, a base portion located in proximity to the proximal end of said elongated body, said base portion connected to a top face of said cap, and a tip portion located in proximity to the distal end of said elongated body;

attaching an electrical accessory to a mounting element of said tip portion;

connecting said electrical accessory to a power connection located within said tip portion;

and powering said electrical accessory via said power connection.

16. The method of claim 15, wherein said portable accessory is one of the accessories chosen from the list comprising: a smart phone; a tablet computer; a digital camera; a geographical positioning system (GPS) unit; and a fish finder.

17. The method of claim 15, wherein said piece of equipment comprises a shallow water anchor.

18. The system of claim 15, wherein said piece of equipment comprises a boat motor.

19. An accessory powering system comprising:

a housing connected to a power source on a marine vessel, said housing affixed to an exterior portion of said marine vessel, and said housing have a mounting port and a power port;

a monopod including a cylindrical elongated body portion having a proximal end and a distal end, a base portion located in proximity to the proximal end of said elongated body, said base portion configured to interface with said mounting port, and a tip portion located in proximity to the distal end of said elongated body;

wherein said monopod is configured to interface with a portable accessory;

said power port capable of providing electrical power to said portable accessory; and said tip portion further comprising an accessory mount configured for receiving and connecting said portable accessory.

* * * * *